United States Patent
Antchak et al.

(10) Patent No.: US 11,629,762 B2
(45) Date of Patent: Apr. 18, 2023

(54) PROPORTIONALLY DAMPED POWER TRANSFER DEVICE USING TORSION SPRING FORCE

(71) Applicant: Litens Automotive Partnership, Woodbridge (CA)

(72) Inventors: John R. Antchak, Aurora (CA); Jun Xu, Woodbridge (CA); Warren J. Williams, Oakville (CA); Evan J. Hurry, Holland Landing (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 378 days.

(21) Appl. No.: 16/775,728

(22) Filed: Jan. 29, 2020

(65) Prior Publication Data

US 2020/0166084 A1   May 28, 2020

Related U.S. Application Data

(62) Division of application No. 15/509,330, filed as application No. PCT/CA2015/050876 on Sep. 10, 2015, now Pat. No. 10,590,994.

(Continued)

(51) Int. Cl.
*F16D 3/72*   (2006.01)
*F16D 7/02*   (2006.01)
(Continued)

(52) U.S. Cl.
CPC ............... *F16D 3/72* (2013.01); *F02B 63/04* (2013.01); *F02B 67/06* (2013.01); *F16D 7/022* (2013.01);
(Continued)

(58) Field of Classification Search
CPC ...... F16H 2055/366; F16H 55/36; F16H 7/20; F16H 7/0827; F16H 7/02; F16D 41/206;
(Continued)

(56) References Cited

U.S. PATENT DOCUMENTS 4,473,362 A  *  9/1984  Thomey .................. F02B 67/06
                                                474/135
4,689,037 A  *  8/1987  Bytzek .................. F16H 7/1218
                                                474/135

(Continued)

FOREIGN PATENT DOCUMENTS

CA       2426066 A1   10/2003
CN       102472373 A   5/2012
(Continued)

OTHER PUBLICATIONS

ISR/WO for PCT/CA2018/050386 dated May 31, 2018.
(Continued)

*Primary Examiner* — Henry Y Liu
(74) *Attorney, Agent, or Firm* — Aird & McBurney LP

(57) ABSTRACT

In an aspect, a power transfer device, such as a decoupler, is provided for transferring torque between a shaft and a belt. The device includes: a hub configured to couple to the shaft, a pulley rotatably coupled to the hub that includes a power transmitting surface configured to engage the belt, an isolation spring to transfer a rotational load from one of the pulley and the hub to the other of the pulley and the hub, optionally a one-way clutch to permit overrunning of one of the pulley and the hub relative to the other of the pulley and the hub in a first direction, and a damping member positioned to be driven into frictional engagement with a friction surface by a force from the isolation spring acting on the damping member that varies based on the rotational load transferred by the isolation spring.

21 Claims, 35 Drawing Sheets

Related U.S. Application Data

(60) Provisional application No. 62/207,897, filed on Aug. 20, 2015, provisional application No. 62/105,751, filed on Jan. 21, 2015, provisional application No. 62/084,534, filed on Nov. 25, 2014, provisional application No. 62/048,786, filed on Sep. 10, 2014.

(51) Int. Cl.
| | |
|---|---|
| *F16D 41/20* | (2006.01) |
| *F02B 67/06* | (2006.01) |
| *F16H 55/36* | (2006.01) |
| *F16H 7/20* | (2006.01) |
| *F16F 15/121* | (2006.01) |
| *F02B 63/04* | (2006.01) |
| *F16H 7/02* | (2006.01) |
| *F16H 7/08* | (2006.01) |

(52) U.S. Cl.
CPC ........ F16D 41/206 (2013.01); F16F 15/1216 (2013.01); F16H 7/02 (2013.01); F16H 7/0827 (2013.01); F16H 7/20 (2013.01); F16H 55/36 (2013.01); *F16D 2300/22* (2013.01); *F16H 2055/366* (2013.01)

(58) Field of Classification Search
CPC .......... F16D 3/12; F16D 3/14; F16D 2300/22; F16D 7/022; F16D 3/72; F16F 15/1216; F02B 67/06; F02B 63/04
USPC ...................................................... 474/70, 94
See application file for complete search history.

(56) References Cited

U.S. PATENT DOCUMENTS

| | | | | |
|---|---|---|---|---|
| 4,698,049 A * | 10/1987 | Bytzek | ................. | F16H 7/1218 384/271 |
| 4,725,260 A * | 2/1988 | Komorowski | ........ | F16H 7/1218 474/135 |
| 6,083,130 A * | 7/2000 | Mevissen | ................ | F16D 7/022 474/69 |
| 7,153,227 B2 * | 12/2006 | Dell | .......................... | F16D 3/12 474/70 |
| 7,591,357 B2 * | 9/2009 | Antchak | ................. | F16F 15/12 192/81 C |
| 7,931,552 B2 * | 4/2011 | Pendergrass | ............ | F16D 41/22 192/113.32 |
| 7,998,008 B2 * | 8/2011 | Kamdem | ................ | F16D 47/02 474/902 |
| 8,132,657 B2 * | 3/2012 | Antchak | ................. | F16D 7/022 474/70 |
| 8,192,312 B2 * | 6/2012 | Ali | .......................... | F16H 55/36 474/94 |
| 8,202,183 B2 * | 6/2012 | Riu | ....................... | F16D 41/203 474/70 |
| 8,272,982 B2 * | 9/2012 | Fitz | ......................... | F16H 55/36 474/70 |
| 8,302,753 B2 * | 11/2012 | Antchak | ............. | F16F 15/1442 192/113.32 |
| 8,529,387 B2 * | 9/2013 | Lannutti | ................. | F16D 13/76 192/113.32 |
| 8,931,610 B2 * | 1/2015 | Serkh | ........................ | F16D 3/12 474/94 |
| 9,169,914 B2 * | 10/2015 | Serkh | ........................ | F16D 3/72 |
| 9,341,254 B2 * | 5/2016 | Ward | ...................... | F16H 55/36 |
| 9,423,015 B2 * | 8/2016 | Chang | ................... | F16H 7/0827 |
| 9,556,948 B2 * | 1/2017 | Yun | ......................... | F16H 55/49 |
| 9,611,928 B2 * | 4/2017 | Li | ............................ | F16H 55/36 |
| 9,651,099 B2 * | 5/2017 | Antchak | ................ | F16D 41/206 |
| 9,982,769 B2 * | 5/2018 | Hauck | ..................... | F16H 55/36 |
| 10,066,727 B2 * | 9/2018 | Bourgeais | ............ | F16D 41/206 |
| 10,087,994 B2 * | 10/2018 | Serkh | ........................ | F16D 7/022 |
| 10,520,039 B2 * | 12/2019 | Serkh | ........................ | F16H 55/36 |
| 10,794,448 B2 * | 10/2020 | Replete | ................ | F16F 15/1216 |
| 10,816,041 B2 * | 10/2020 | Kastner | ..................... | F16D 7/022 |
| 11,236,812 B2 * | 2/2022 | Canto Michelotti | ..... | F16D 3/72 |
| 2004/0014540 A1 * | 1/2004 | Dell | .......................... | F16H 55/36 474/69 |
| 2007/0066426 A1 * | 3/2007 | Kamdem | ................ | F16D 47/02 474/70 |
| 2008/0139351 A1 * | 6/2008 | Pflug | ..................... | F16F 15/123 474/94 |
| 2009/0194380 A1 * | 8/2009 | Ali | ........................ | F16F 15/123 188/381 |
| 2010/0147646 A1 * | 6/2010 | Lannutti | ................. | F16D 13/76 192/41 S |
| 2011/0065537 A1 * | 3/2011 | Serkh | ................... | F16F 15/1216 474/94 |
| 2011/0162938 A1 * | 7/2011 | Antchak | ............... | F16D 41/206 192/41 S |
| 2011/0281678 A1 * | 11/2011 | Cali | ........................ | F16H 55/36 474/171 |
| 2012/0088610 A1 * | 4/2012 | Anton | .................... | A63B 57/30 473/409 |
| 2013/0098727 A1 * | 4/2013 | Williams | .............. | F16D 41/206 192/56.2 |
| 2013/0150191 A1 * | 6/2013 | Ishida | ........................ | F16D 3/12 474/94 |
| 2013/0216524 A1 * | 8/2013 | Ricci | ...................... | A61K 31/69 514/64 |
| 2013/0217524 A1 * | 8/2013 | Antchak | ................. | F02B 67/06 474/94 |
| 2013/0237351 A1 * | 9/2013 | Marion | ..................... | F16D 7/00 474/70 |
| 2013/0324335 A1 * | 12/2013 | Chen | ..................... | F16D 41/206 474/94 |
| 2013/0345004 A1 * | 12/2013 | McCrary | ................. | F16H 55/36 474/148 |
| 2014/0274506 A1 * | 9/2014 | Lannutti | ................. | F16H 55/36 474/70 |
| 2014/0305765 A1 * | 10/2014 | Serkh | ...................... | F16H 55/36 192/41 S |
| 2015/0285312 A1 * | 10/2015 | Williams | ................ | F16H 55/36 464/57 |
| 2015/0285365 A1 * | 10/2015 | Canto Michelotti | ..... | F16D 3/72 474/94 |
| 2015/0308556 A1 * | 10/2015 | Liu | ......................... | F16H 55/36 474/94 |
| 2015/0316138 A1 * | 11/2015 | Dell | ........................ | F16H 55/36 474/94 |
| 2016/0091048 A1 * | 3/2016 | Tran | .................. | F16F 15/12373 474/94 |
| 2016/0146328 A1 * | 5/2016 | Dell | ........................ | B60K 25/02 474/94 |
| 2016/0195182 A1 * | 7/2016 | Cariccia | ................. | F16H 55/36 474/94 |
| 2016/0201757 A1 * | 7/2016 | Tran | ........................ | F02N 11/04 474/94 |
| 2016/0223050 A1 * | 8/2016 | Williams | .................. | F16D 3/14 |

FOREIGN PATENT DOCUMENTS

| | | |
|---|---|---|
| CN | 103140693 A | 6/2013 |
| CN | 103210226 A | 7/2013 |
| JP | 2008169895 A | 7/2008 |
| JP | 2008267563 A | 11/2008 |
| JP | 2008298290 A | 12/2008 |
| JP | 201252576 A | 3/2012 |
| JP | 2012553711 A | 12/2012 |
| JP | 2013504028 A | 2/2013 |
| JP | 5499172 B2 | 5/2014 |
| WO | 2000014427 A3 | 10/2000 |
| WO | 2010037232 A1 | 4/2010 |
| WO | 2011008291 A1 | 1/2011 |
| WO | 2011160215 A1 | 12/2011 |
| WO | 2012061936 A1 | 5/2012 |
| WO | 2013192407 A2 | 12/2013 |

(56) References Cited

FOREIGN PATENT DOCUMENTS

WO  2015048885 A1  4/2015
WO  2016037283 A1  3/2016

OTHER PUBLICATIONS

Office Action for CN2015800484835 dated Jun. 5, 2018.
Office Action for CN2015800484835 dated Jun. 5, 2018—English translation.
Extended European Search Report for EP15840737 dated Nov. 19, 2018.
Office Action for U.S. Appl. No. 15/509,330 dated Apr. 5, 2019.
Office Action for U.S. Appl. No. 15/509,330 dated Sep. 4, 2019.
Office Action for BR 11 2017 004585 0 dated Jul. 30, 2020.
Office Action for IN application No. 201747007731 dated Mar. 3, 2020.
Office Action for JP 2017-513651 dated Jun. 1, 2020.
Office Action for CN201880021708.1 dated Apr. 26, 2021.
KR10-2017-7006300, Office Action & English translation thereof, dated Dec. 15, 2021, Korean Intellectual Property Office.
CN201880021708.1, Office Action & English translation thereof, dated Jan. 4, 2022, China National Intellectual Property Administration.

* cited by examiner

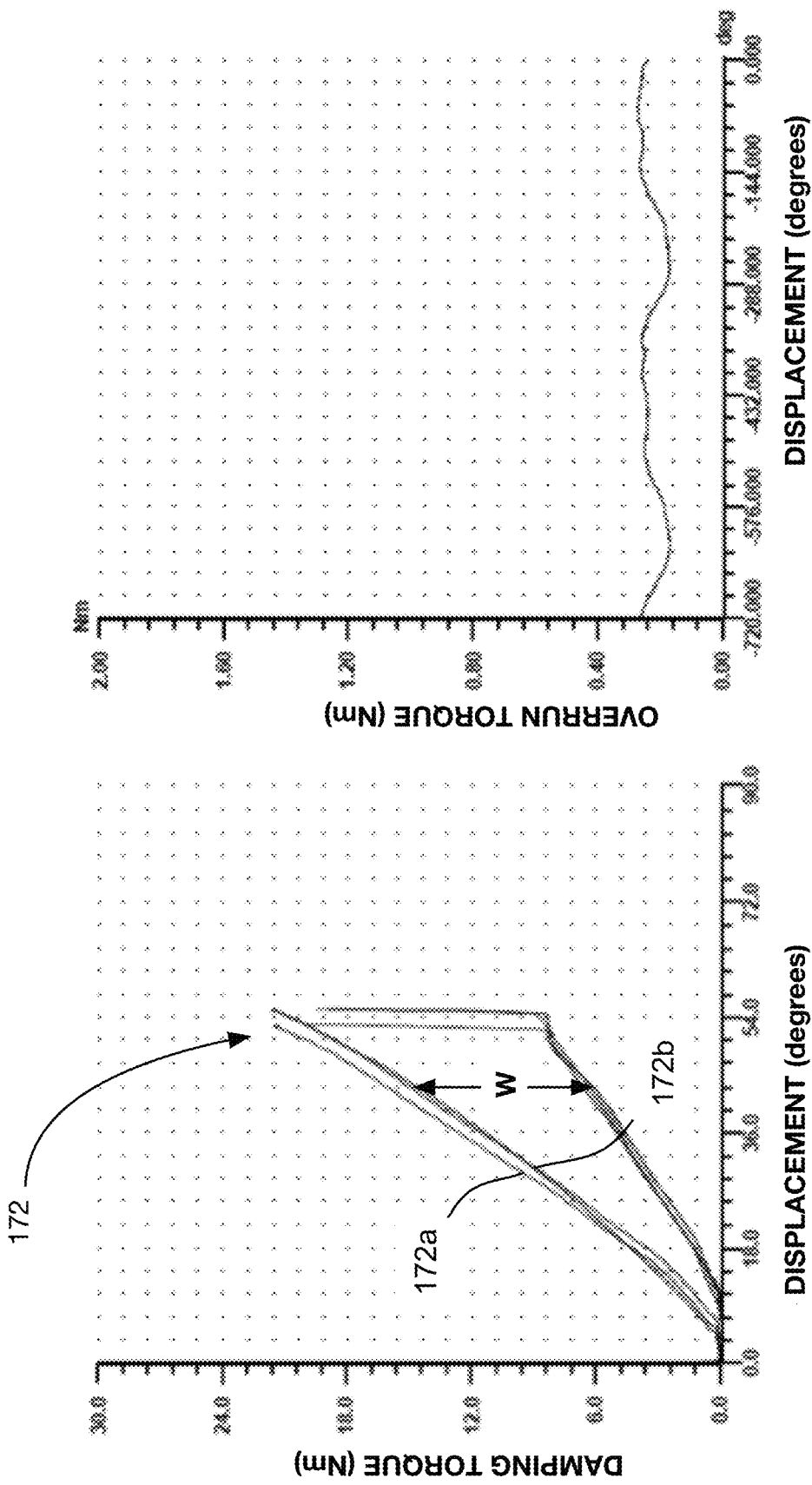

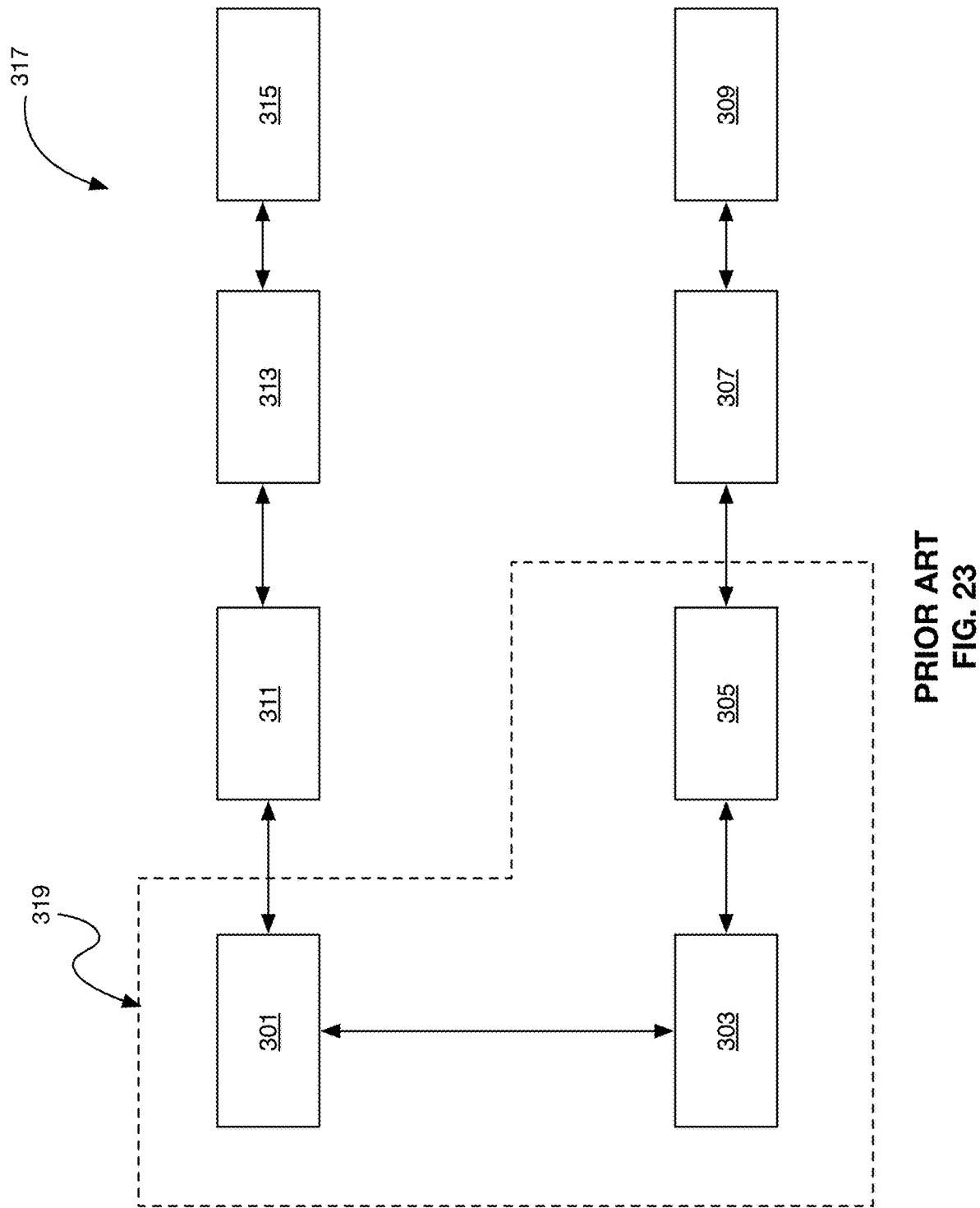

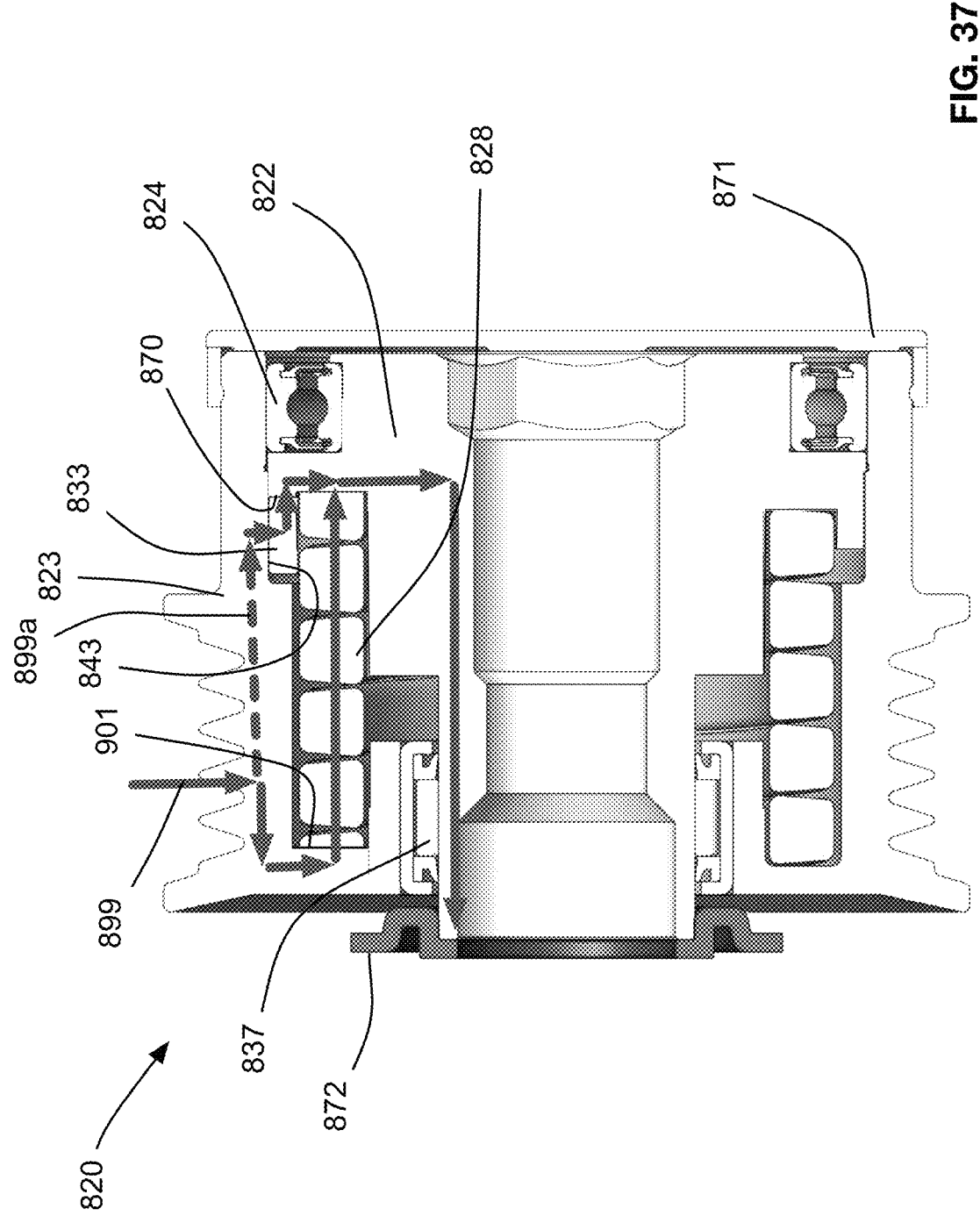

PROPORTIONALLY DAMPED POWER TRANSFER DEVICE USING TORSION SPRING FORCE

CROSS-REFERENCE TO RELATED APPLICATIONS

This application is a divisional application of U.S. patent application Ser. No. 15/509,330, filed on Mar. 7, 2017, which is a U.S. National Stage of International Application of PCT/CA2015/050876, filed on Sep. 10, 2015, which claims the benefit of U.S. Provisional Application No. 62/048,786, filed on Sep. 10, 2014, U.S. Provisional Application No. 62/084,534, filed on Nov. 25, 2014, U.S. Provisional Application No. 62/105,751, filed on Jan. 21, 2015 and U.S. Provisional Application No. 62/207,897, filed on Aug. 20, 2015 the contents of which are incorporated herein by reference in their entireties.

FIELD

The specification relates generally to decoupling mechanisms for allowing accessories driven by an endless power transmitting member, such as a single- or poly-V belt, to operate temporarily at a speed other than the speed of the endless power transmitting member.

BACKGROUND OF THE DISCLOSURE

It is known to provide a decoupling mechanism on an accessory, such as an alternator, that is driven by a belt from the crankshaft of an engine in a vehicle. Such a decoupling mechanism, which may be referred to as a decoupler assembly or a decoupler, permits the associated accessory to operate temporarily at a speed that is different than the speed of the belt. As is known, the crankshaft undergoes cycles of accelerations and decelerations associated with the firing of the cylinders in the engine. The decoupler permits the alternator shaft to rotate at a relatively constant speed even though the crankshaft from the engine, and hence, the pulley of the decoupler, will be subjected to these same cycles of decelerations and accelerations, commonly referred to as rotary torsional vibrations, or torsionals.

Furthermore, it is known to provide an isolator mechanism on an accessory to buffer at least some torsional vibration between the pulley and the hub operatively connected to the accessory drive shaft.

Such decouplers or isolators can be valuable additions to the powertrain of the vehicle. However, some engines are harsher on the decoupler or isolator than other engines and the decouplers or isolators on such engines do not last as long as would otherwise be desired. It would be advantageous to provide a decoupler or an isolator that worked on such engines.

SUMMARY OF THE DISCLOSURE

According to a first set of embodiments, there is provided a decoupler for transferring torque between a shaft and an endless power transmitting member. The decoupler includes a hub configured to couple to the shaft and to rotate with the shaft about a rotational axis, a pulley rotatably coupled to the hub and including a power transmitting surface configured to engage the endless power transmitting member, an isolation spring configured to transfer a rotational load from one of the pulley and the hub to the other of the pulley and the hub, and a one-way clutch configured to permit overrunning of one of the pulley and the hub relative to the other of the pulley and the hub in a first rotational direction. The decoupler further includes a damping member positioned to be driven into frictional engagement with a friction surface on one of the pulley and the hub by a force from the isolation spring acting on the damping member that varies based on the rotational load transferred by the isolation spring.

According to a second set of embodiments, there is provided a decoupler for transferring torque between a shaft of an alternator and an endless power transmitting member driven by a crankshaft of an internal combustion engine having an engine control unit. The decoupler includes a hub configured to couple to the shaft and to rotate with the shaft about a rotational axis, a pulley rotatably coupled to the hub and including a power transmitting surface configured to engage the endless power transmitting member, an isolation spring configured to transfer a rotational load from one of the pulley and the hub to the other of the pulley and the hub, wherein the isolation spring is a helical torsion spring having a first helical end and a second helical end and the rotational load transferred by the isolation spring is transferred to the hub via the second helical end, and a one-way clutch configured to permit overrunning of one of the pulley and the hub relative to the other of the pulley and the hub in a first rotational direction. The decoupler further includes a damping member positioned to be driven into frictional engagement with a friction surface on one of the hub and the pulley by a force from the isolation spring acting on the damping member that varies proportionally with the rotational load transferred by the isolation spring. The the damping member is circumferentially between the second helical end and the hub so as to transfer torque between the second helical end and the hub, and is movable in a radial direction, and the damping member includes a first end configured to engage the second helical end and a second end radially offset from the first end by an angular width, the second end configured to engage an engagement surface of the hub. The force from the isolation spring is a vector portion based on a magnitude of the rotational load transferred between the isolation spring and the hub via the damping element and is based on the angular width. Damping is provided by the damping member over a range of damping values, and at an upper end of the range, the damping is sufficient to lock at least the pulley, the hub, the damping member and the isolation spring together to change a resonance condition of the decoupler sufficient for at least one of an alternator regulator of the alternator to select a new voltage parameter and the engine control unit to select a new firing frequency.

According to a third set of embodiments, there is provided an accessory drive arrangement. The accessory drive arrangement includes an engine including a crankshaft, a crankshaft pulley and an endless power transmitting member driven by the crankshaft pulley, an alternator including an alternator shaft and a decoupler configured to transfer torque between the alternator shaft and the endless power transmitting member. The decoupler includes a hub configured to couple to the alternator shaft and to rotate with the alternator shaft about a rotational axis, a pulley rotatably coupled to the hub and including a power transmitting surface configured to engage the endless power transmitting member, an isolation spring configured to transfer a rotational load from one of the pulley and the hub to the other of the pulley and the hub, wherein the isolation spring is a helical torsion spring having a first helical end and a second helical end and the rotational load transferred by the isolation spring is transferred to the hub via the second helical end and one-way clutch configured to permit overrunning of one of the pulley and the hub relative to the other of the pulley and the hub in a first rotational direction. The decoupler further includes a damping member positioned to be driven into frictional engagement with a friction surface on one of the hub and the pulley by a force from the isolation spring acting on the damping member that varies proportionally with the rotational load transferred by the isolation spring. The damping member is circumferentially between the second helical end and the hub so as to transfer torque between the second helical end and the hub, and is movable in a radial direction, and the damping member includes a first end configured to engage the second helical end and a second end radially offset from the first end by an angular width, the second end configured to engage an engagement surface of the hub. The force from the isolation spring is a vector portion based on a magnitude of the rotational load transferred between the isolation spring and the hub via the damping element and is based on the angular width. Damping is provided by the damping member over a range of damping values, and at an upper end of the range, the damping is sufficient to lock at least the pulley, the hub, the damping member and the isolation spring together to change a resonance condition of the decoupler sufficient for at least one of an alternator regulator of the alternator to select a new voltage parameter and the engine control unit to select a new firing frequency.

According to a fourth set of embodiments, there is provided a power transfer device for transferring torque between a shaft and an endless power transmitting member. The power transfer device includes a hub configured to couple to the shaft and to rotate with the shaft about a rotational axis, a pulley rotatably coupled to the hub and including a power transmitting surface configured to engage the endless power transmitting member and an isolation spring configured to transfer a rotational load from one of the pulley and the hub to the other of the pulley and the hub. The power transfer device further includes a damping member positioned to be driven into frictional engagement with a friction surface on one of the pulley and the hub by a force from the isolation spring acting on the damping member that varies based on the rotational load transferred by the isolation spring. In some embodiments, the power transfer device is an isolator, whereas in some other embodiments the power transfer device is a decoupler.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIG. 10A is a hysteresis loop of damping torque versus angular displacement of a decoupler configured similarly to the decoupler of FIG. 3;

FIG. 10B is a graph of overrun torque versus displacement in degrees of the decoupler of FIG. 10A;

FIG. 23 is a schematic of an engine including a typical, prior art decoupler;

FIG. 37 is a sectional side view of a power transfer device according to another set of non-limiting embodiments of the present invention.

DETAILED DESCRIPTION

In some cases, it has been found that it may be desirable to include at least some torsional damping in a decoupler or an isolator. For example, torsional damping may help to ensure that components of the decoupler or isolator, such as the isolation spring, or the driven component itself, such as the alternator, are not overstressed, which may help extend the life of those components.

Figure 1:
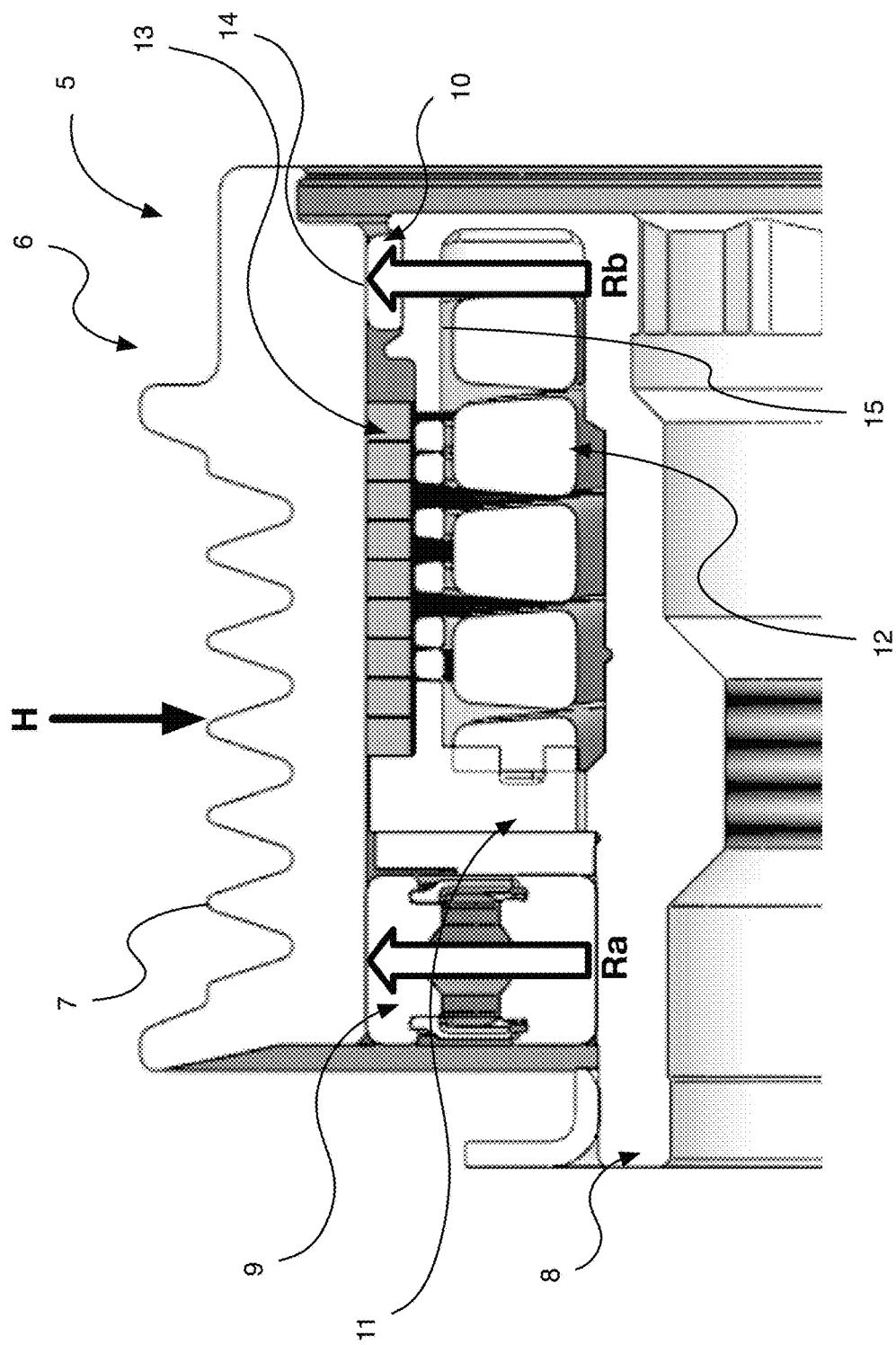
FIG. 1 is a cross-section view of a prior art decoupler.

FIG. 1 depicts a cross-section of a prior art decoupler 5. The decoupler 5 includes a pulley 6, which includes a power transmitting surface 7 to engage an endless power transmitting member (not shown), such as a poly-V belt, that is connected to an engine crankshaft (not shown), and a hub 8 for coupling to a drive shaft (not shown) of a driven accessory, such as an alternator (not shown). The pulley 6 is rotatably supported on the hub 8 by a ball bearing 9 at one axial end of the hub 8 and a bushing 10 at another axial end of the hub 8. A torsion spring 12 has a first helical end that is coupled to a carrier 11, and a second helical end that is coupled to the hub 8. The decoupler 5 also includes a one-way clutch 13 for engaging and disengaging the pulley 6 from the hub 8 when the hub 8 moves (overruns) in a first rotational direction relative to the pulley 6. The one-way clutch 13 is also coupled to the carrier 11. Rotational load is transferred between the pulley and the hub via the carrier 11 and the torsion spring 12.

As in other typical decouplers, some inherent damping of the movement of the components relative to one another may occur in the decoupler 5. As shown in FIG. 1, the endless power transmitting member applies a hubload, H, on the pulley 6, which is normal to the bushing 10. The bushing 10 resists the hubload, H, with a normal resistive force, Rb. The bushing 10 slides against an inner surface 14 of the pulley 6 as the hub 8 and the pulley 6 rotate independently of one another resulting in frictional damping. This frictional damping is dependent on the hubload, H, but is independent of the drive load on the alternator shaft (not shown) transferred by the engagement of the torsion spring 12 with the hub 8. In other words, the damping being provided by the decoupler 5 is the same regardless of the rotational load being transferred by the torsion spring 12. Furthermore, this damping is bi-directional in that it is present regardless of whether the one-way clutch 13 is engaged or disengaged. As a result, this damping is present in at least some cases where is it undesirable. For example, when it is desirable to disengage the hub 8 from the pulley 6 to allow the hub 8 to overrun relative to the pulley, this damping would act against this disengagement since the bushing 10 would remain frictionally engaged with the inner surface 14 of the pulley 6.

It is understood that the ball bearing 9 also resists the hubload, H, with a resistive force, Ra. However, the rolling elements of the ball bearing 9 create relatively low drag friction and therefore do not provide any significant damping for the decoupler 5 as a result of the resistive force, Ra.

It is also understood that the damping provided by the bushing 10 is in addition to the damping that is usually provided by general interference between components, surface treatments or coatings, material properties of the components of the decoupler 5.

In contrast, the inventive decouplers and isolators described herein are configured to provide at least some damping that varies based on the rotational load transferred by an isolation spring between a hub and a pulley. In other words, at least some of the damping is asymmetric and is not applied when the pulley is disengaged from the hub. For example, as more fully described below, the damping can vary in proportion to the drive load applied to the pulley that is transferred as a rotational load to the hub by the isolation spring.

Figure 2:
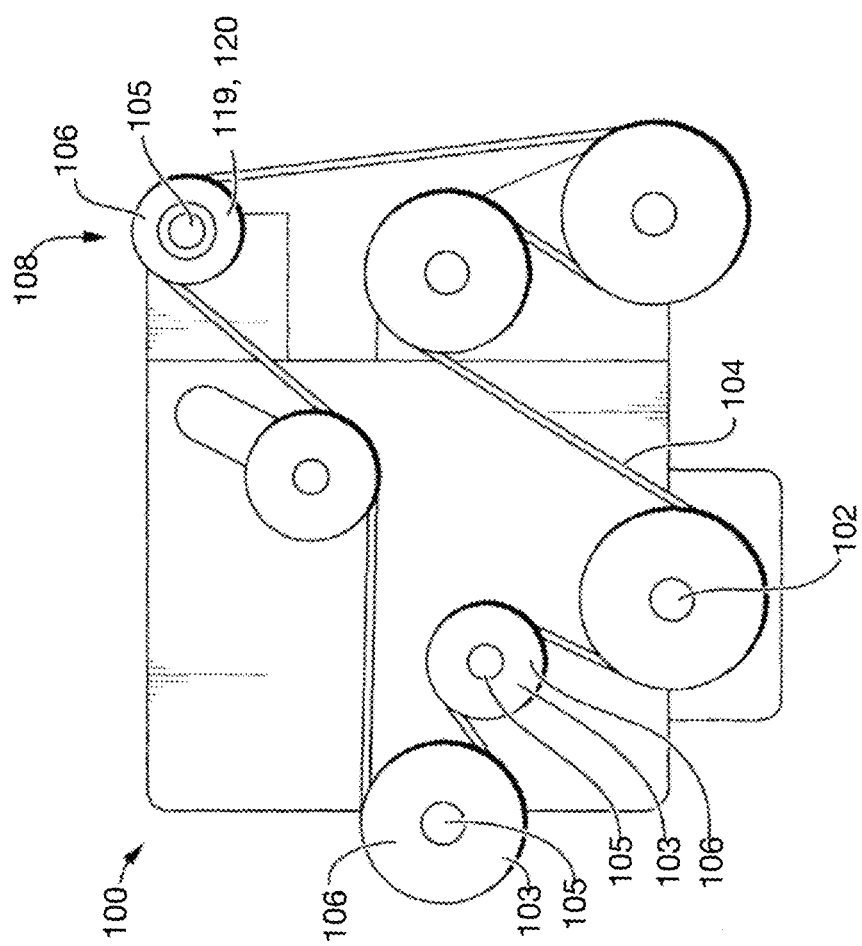
FIG. 2 is an elevation view of an engine with a plurality of belt driven accessories, one of which has a decoupler in accordance with a non-limiting embodiment of the present disclosure.

FIG. 2 depicts an engine 100 for a vehicle. In some embodiments, the engine 100 is an internal combustion engine. The engine 100 includes a crankshaft 102 which drives an endless power transmitting member 104. The endless power transmitting member may be, for example, a belt. Throughout this disclosure, the endless power transmitting member 104 may, for convenience, be referred to as a belt 104, however it will be understood that any other suitable endless power transmitting member may alternatively be used. Via the belt 104, the engine 100 drives a plurality of accessories 106, such as an alternator 108. Each accessory 106 includes an input drive shaft 105, such as alternator drive shaft, with a pulley 103 thereon, which is driven by the belt 104. A power transfer device 119 in accordance with an embodiment of the present invention may be provided, instead of a pulley, between the belt 104 and the input shaft 105 of any one or more of the belt driven accessories 106, and in particular the alternator 108. The power transfer device 119 is configured to transfer torque between the shaft 105 and the endless power transmitting member (e.g., the belt 104). The power transfer device 119 may be, for example, a decoupler 120 as shown in FIG. 2, an isolator 820, as shown in FIG. 37, or any other suitable device. The power transfer device 119 is shown as being connected to the input shaft 105 of an accessory (e.g. the alternator 108), however, it will be understood that the power transfer device 119 could be connected to the output shaft of the engine 100 (i.e. the crankshaft 102).

Figure 3:
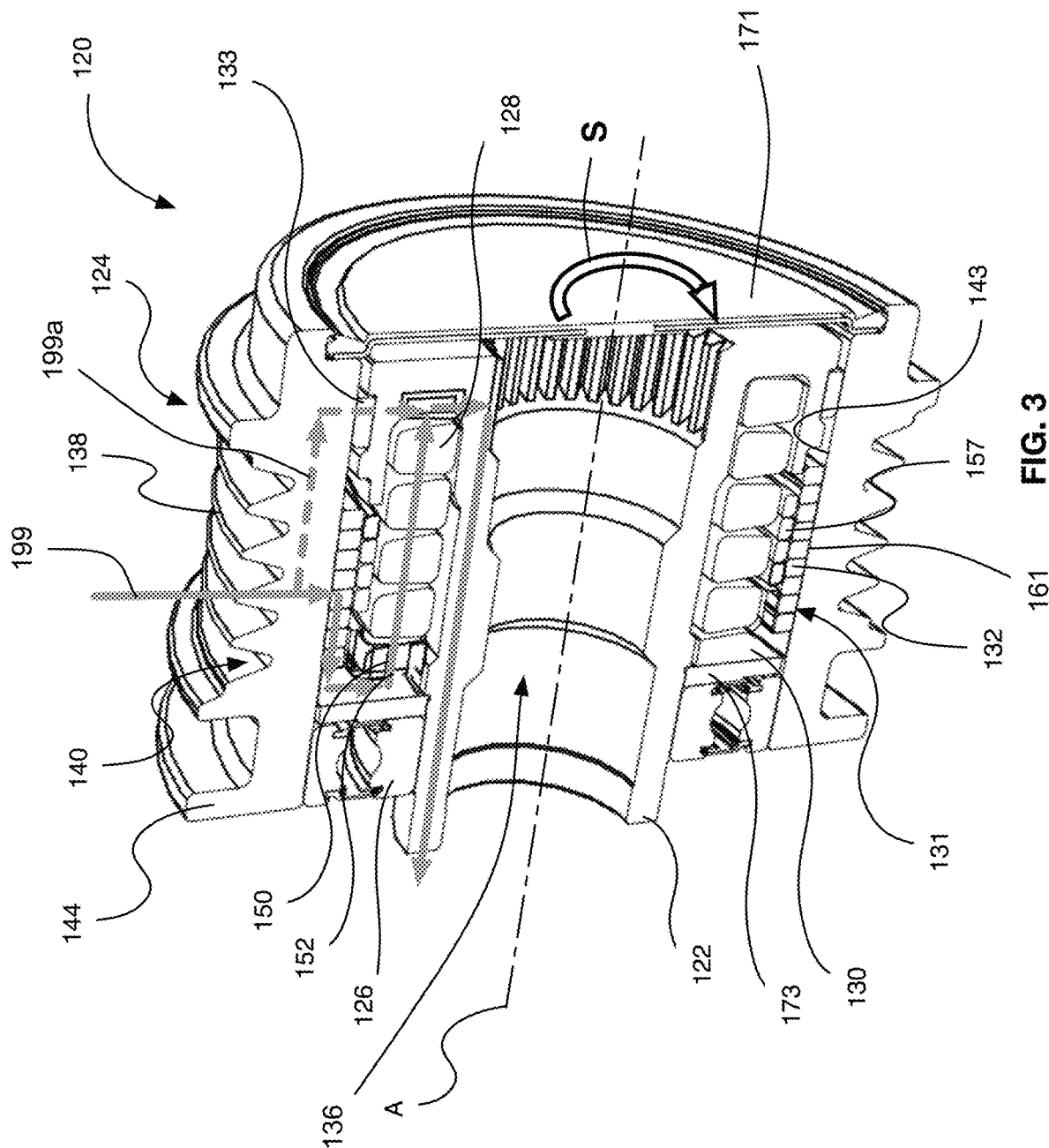
FIG. 3 is a cross-section view of a decoupler according to one set of non-limiting embodiments of the present disclosure.

FIG. 3 depicts a sectional view of the example decoupler 120. The decoupler 120 includes a hub 122, a pulley 124, a first bearing member 126, an isolation spring 128, a carrier 130, a one-way clutch 131, which in the example decoupler 120 is a one-way wrap spring clutch 132, and a damping member 133. It is understood that any suitable clutch mechanism may be utilized as the one-way clutch 131. For example, in some embodiments, the one-way clutch 131 is a roller clutch and in some other embodiments, the one-way clutch 131 is a sprag clutch mechanism. Although the damping members are described herein in respect of a decoupler, it is understood that the damping members and the variable damping provided by the described dampers, can be utilized in an isolator mechanism, which does not include a one-way clutch.

The hub 122 is configured to couple to a shaft, such as the accessory shaft 105 (FIG. 2), in any suitable way. For example, the hub 122 may include a shaft-mounting aperture 136 therethrough that is used for mounting the hub 122 to the end of the accessory shaft 105 to rotate with the shaft 105 about a rotational axis A.

The pulley 124 is rotatably coupled to the hub 122 in any suitable way. The pulley 124 includes a power transmitting surface 138 that is configured to engage the endless power transmitting member 104, which in the example decoupler 120 is the belt 104. The belt 104 may be a poly-V belt and the power transmitting surface 138 may include grooves 140 to engage corresponding protrusions on the poly-V belt. However, it is understood that the power transmitting surface 138 may be any other suitable configuration and the belt 104 may not be a poly-V belt. For example, the pulley 124 could have a single groove and the belt 104 could be a single-V belt, or the pulley 124 may have a generally flat portion for engaging a flat belt 104. The pulley 124 further includes a radially inner surface 143, which the wrap spring clutch 132 may engage in order to couple the pulley 124 and the hub 122 together. The pulley 124 may be made from any suitable material, such as a steel, or aluminum, or in some cases a polymeric material, such as certain types of nylon, phenolic or other materials.

The first bearing member 126 rotatably supports the pulley 124 on the hub 122 at a first end 144 of the pulley 124. The first bearing member 126 may be any suitable type of bearing member, such as a bushing made from nylon-4-6 or for some applications it could be PX9A which is made by DSM in Birmingham, Mich., USA, or some other suitable polymeric material, and may be molded directly on the pulley 124 in a two step molding process in embodiments wherein a molded pulley is provided. It may be possible to use a bearing (e.g. a ball bearing) as the first bearing member 126 instead of a bushing. In such a case, the bearing could be inserted into a mold cavity and the pulley 124 could be molded over the bearing 126. Instead of a bearing, a metallic (e.g. bronze) bushing may be provided, which can be inserted into a mold cavity for the pulley molding process in similar fashion to the aforementioned bearing.

The isolation spring 128 is configured to transfer a rotational load from one of the pulley 124 and the hub 122 to the other of the pulley 124 and the hub 122. The isolation spring 128 may be a helical torsion spring that has a first helical end 150 (see also FIG. 5) that is held in an annular slot and that abuts a radially-extending driver wall 152 on the carrier 130. The isolation spring 128 has a second helical end 153 that engages a similar driver wall 154 (FIG. 7) on the hub 122.

Figure 4:
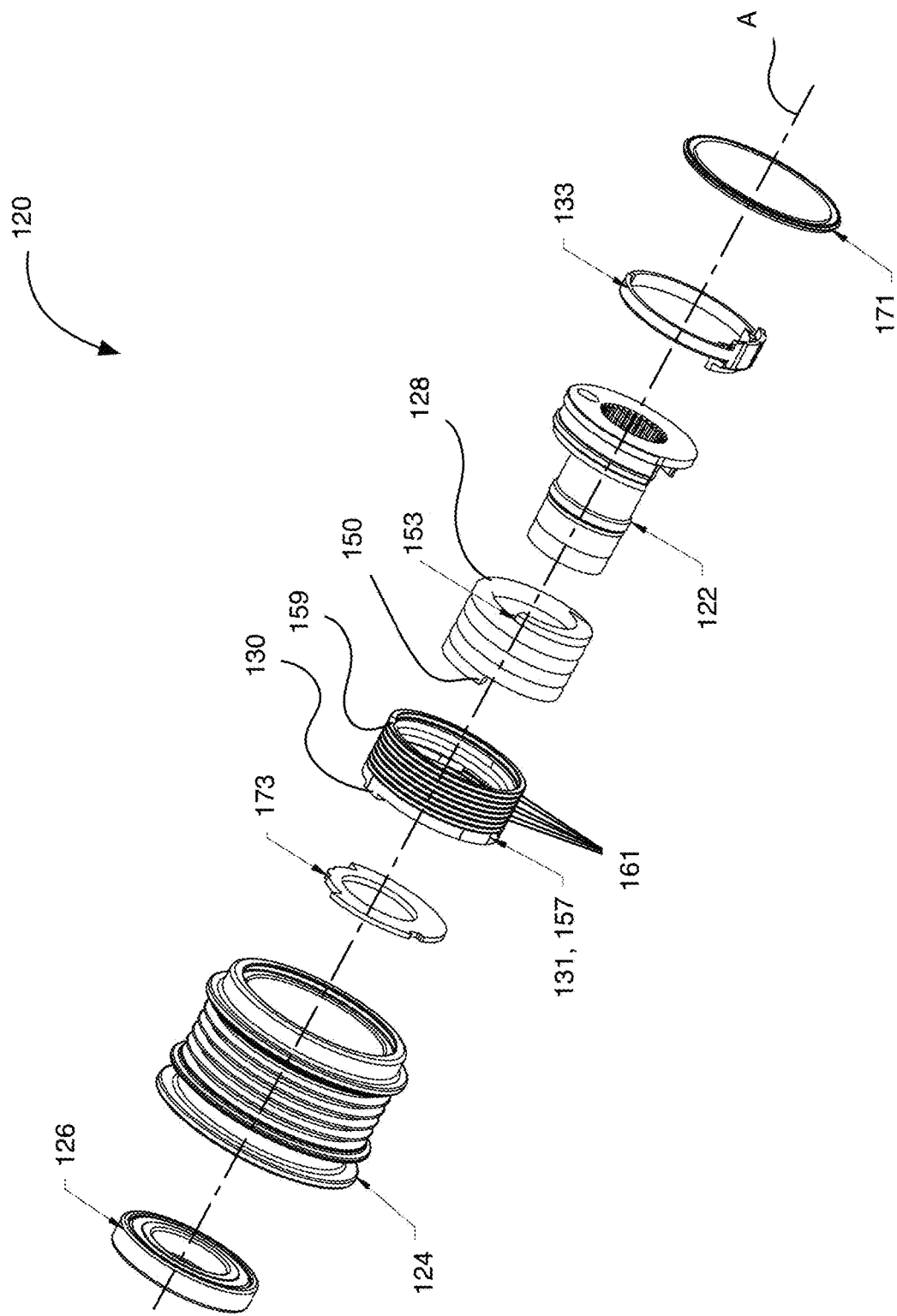
FIG. 4 is an exploded view in a first perspective of the decoupler of FIG. 3.
Figure 5:
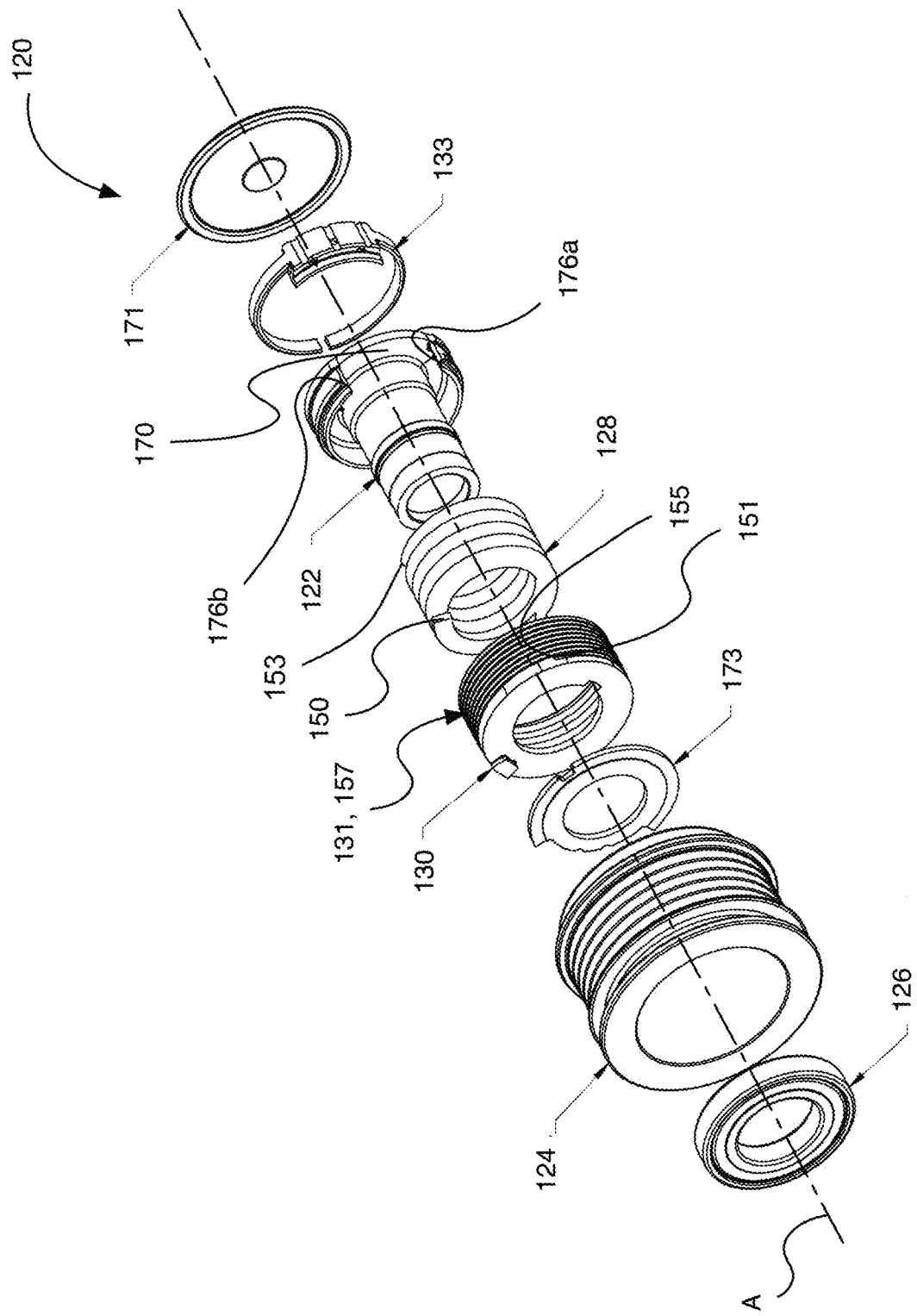
FIG. 5 is an exploded view in a second perspective of the decoupler of FIG. 3.

In the example decoupler 120 shown, the isolation spring 128 has a plurality of coils 161 between the first and second helical ends 150 and 153 (FIGS. 4 and 5). The coils 161 are preferably spaced apart by a selected amount and the isolation spring 128 is preferably under a selected amount of axial compression to ensure that the first and second helical ends 150 and 153 of the spring 128 are abutted with the respective driver walls 152 (FIG. 3) and 154 (FIG. 7) on the carrier 130 and hub 122 respectively. An example of a suitable engagement between the isolation spring 128, the hub 122 and the carrier 130 is shown and described in U.S. Pat. No. 7,712,592, the contents of which are incorporated herein by reference. A thrust plate 173 may be provided to receive the axial thrust force of the carrier 130 resulting from the axial compression of the spring 128.

The isolation spring 128 may be made from any suitable material, such as a suitable spring steel. The isolation spring 128 may have any suitable cross-sectional shape. In the figures, the isolation spring 128 is shown as having a generally rectangular cross-sectional shape, which provides it with a relatively high torsional resistance (i.e. spring rate) for a given occupied volume. However, a suitable spring rate may be obtained with other cross-sectional shapes, such as a circular cross-sectional shape or a square cross-sectional shape.

Alternatively, the isolation spring 128 may be compression spring. As a further alternative, the isolation spring 128 may be one of two or more isolation springs, each of which is a compression spring. Such a configuration is shown in U.S. Pat. No. 7,708,661 and US Patent Application Publication No. 2008/0312014, PCT Publication No. 2007/074016, PCT publication No. 2008/022897, PCT publication No. 2008/067915, and PCT Publication No. 2008/071306, all of which are hereby incorporated by reference in their entirety.

In the example decoupler 120, a sleeve 157 (FIG. 3) is provided between the isolation spring 128 and the wrap spring clutch 132. The sleeve 157 may be, as shown, a helical member itself. However, any suitable configuration is contemplated, such as a hollow cylindrical tube. The sleeve 157 acts as a torque limiter by limiting the amount of room available for radial expansion of the isolation spring 128 (in embodiments wherein the isolation spring 128 is a torsion spring). Thus when a torque is provided by the pulley 124 that exceeds a selected limit, the isolation spring 128 expands until it is constrained by the sleeve 157. An example of a suitable sleeve 157 is shown and described in U.S. Pat. No. 7,766,774, the contents of which are hereby incorporated by reference.

The wrap spring clutch 132 has a first end 151 that is engageable with a radial wall 155 of the carrier 130 and that may be fixedly connected to the carrier 130. The wrap spring clutch 132 has a second end 159 that may be free floating.

The carrier 130 may be made from any suitable material such as, for example, a suitable nylon or the like.

FIG. 3 illustrates a torque path (shown at 199) through the decoupler 120. When a torque is applied from the belt 104 to the pulley 124 to drive the pulley 124 at a speed that is faster than that of the shaft 105, friction between the inner pulley surface 143 of the pulley 124 and the coils 161 of the wrap spring clutch 132 drives at least one of the coils 161 of the wrap spring clutch 132 to at least some angle in a first rotational direction about the axis A, relative to the first end 151 of the wrap spring clutch 132. The relative movement between the one or more coils 161 driven by the pulley 124 relative to the first end 151 causes the wrap spring clutch to expand radially, which further strengthens the grip between the coils 161 of the wrap spring clutch 132 and the inner surface 143 of the pulley 124. The torque transmitted into the wrap spring clutch 132 from the pulley 124 is transmitted from the first end 151 (FIG. 5) of the wrap spring clutch 132 to the carrier 130. The carrier 130 transmits the torque to the isolation spring 128. Torque is transferred from the isolation spring 128 to the hub 122. As a result, the hub 122 is brought up to the speed of the pulley 124. Thus, when the pulley 124 rotates in the first rotational direction (designated in FIG. 3 as S) faster than the hub 122, the wrap spring clutch 132 operatively connects the pulley 124 to the carrier 130 and therefore to the hub 122.

In contrast, when the shaft 105 rotates at a speed greater than the pulley 124 in the first rotational direction S (e.g., when the crankshaft decelerates, and as a result, the pulley 124 decelerates, but due to inertia, the shaft 105 rotates at a faster speed than the pulley 124), the one-way clutch 131 is configured to permit the shaft 105, and as a result, the hub 122, to overrun the pulley 124. In this case, the first end 151 of the wrap spring clutch 132 that is connected to the carrier 130 is rotated relative to the hub 122 in the first rotational direction, S, so as to contract or "wrap down" at least some of the coils 161 of the wrap spring clutch 132 and to draw at least some of the coils 161 of the wrap spring clutch 132 away from frictional engagement with the inner pulley surface 143 of the pulley 124. The wrap spring clutch 132 is sufficiently disengaged from the pulley 124 such that the hub 122 can rotate faster than the pulley 124 in the first rotational direction, S, and no significant rotational load transferred between the pulley 124 and the hub 122 via the carrier 130 and the isolation spring 128.

A seal cap 171 is provided to cover the distal end to prevent intrusion of dirt and debris into the interior space of the decoupler 120.

The damping member 133 is positioned to be driven into frictional engagement with a friction surface on one of the pulley 124 and the hub 122 by a force from the isolation spring 128 acting on the damping member 133 that varies based on the rotational load transferred by the isolation spring 128 between the pulley 124 and the hub 122.

Figure 6:
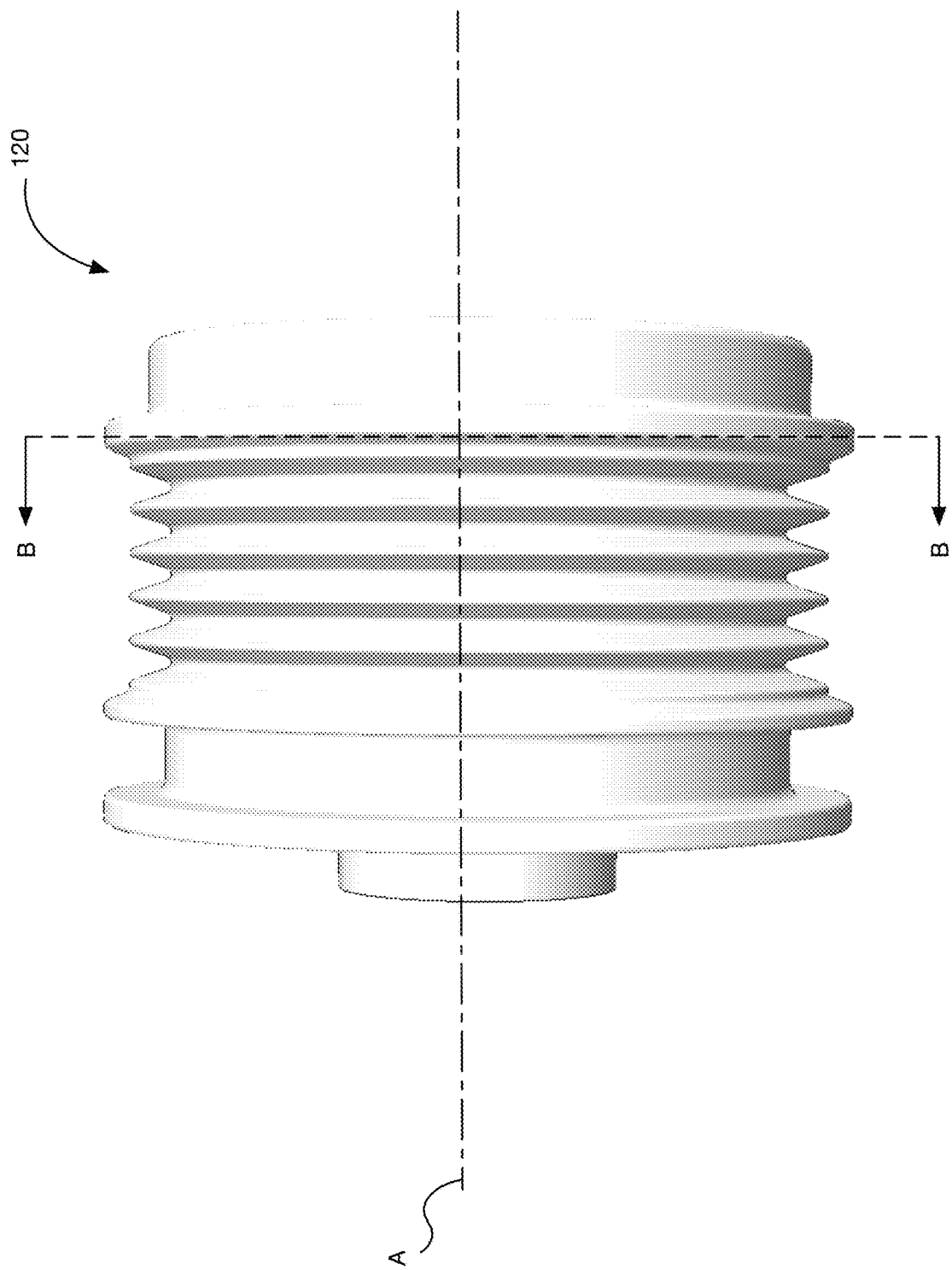
FIG. 6 is a side elevation view of the decoupler of FIG. 3.
Figure 7:
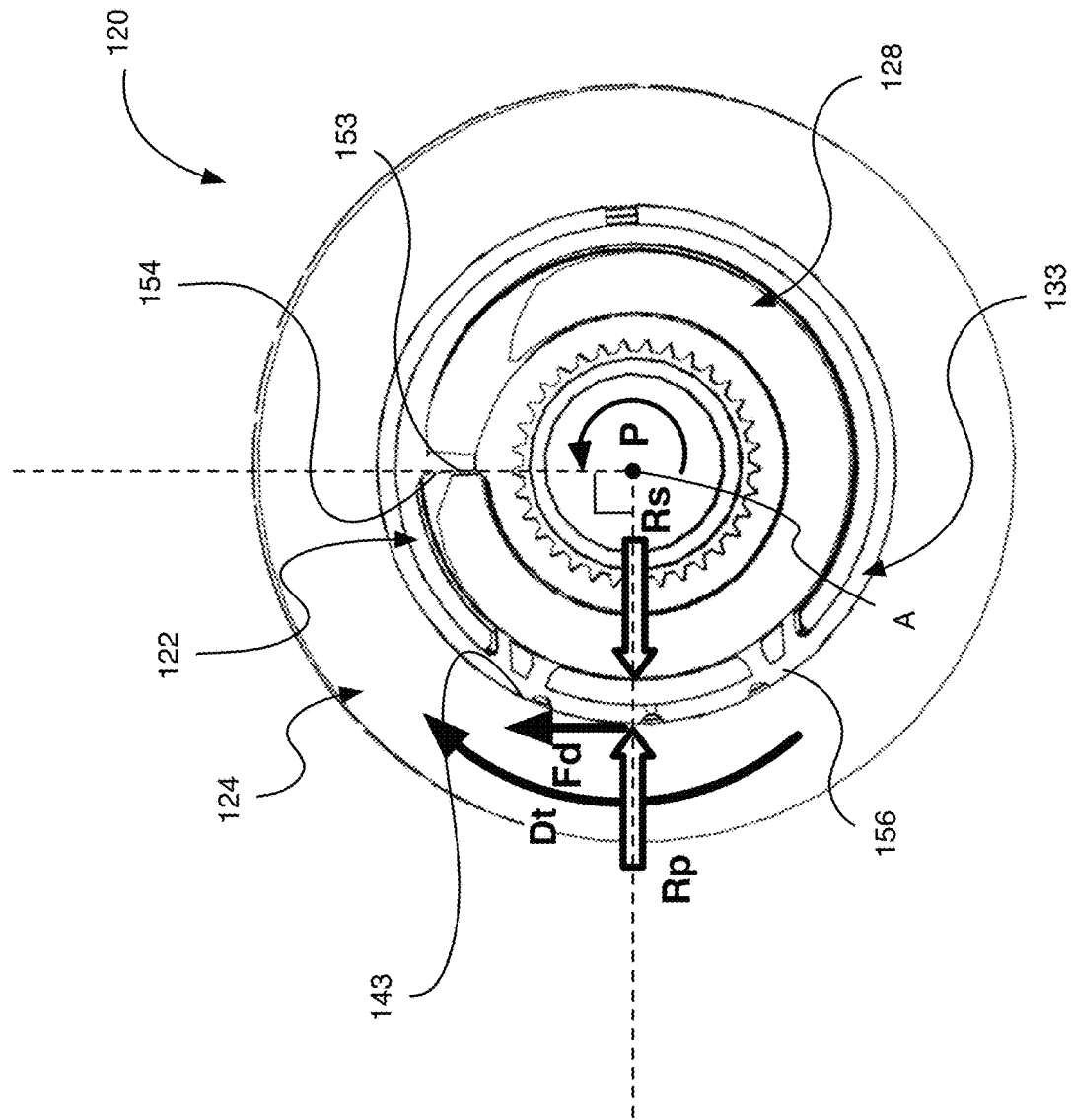
FIG. 7 is a sectional view of the decoupler of FIG. 3, taken along cross-section lines B-B shown in FIG. 6.

FIG. 7 depicts a sectional view of the decoupler 120 along plane B-B (shown in FIG. 6). As the isolation spring 128 opens to resist the rotational load being transferred through the isolation spring 128 (when the hub 122 rotates in the second rotational direction P), the isolation spring 128 generates a radial reaction force, Rs, at a radial position that is about 90 degrees from the second helical end 153 of the isolation spring 128. This radial reaction force, Rs, varies based on the magnitude of the rotational load being transferred by the isolation spring 128 between the pulley 124 and the hub 122. In a typical decoupler, such as the decoupler 5, the radial reaction force, Rs, is directly resisted by the hub 8 itself (for example, at an inner hub surface 15 shown in FIG. 1) and therefore is not transferred radially into a damping member.

Figure 8:
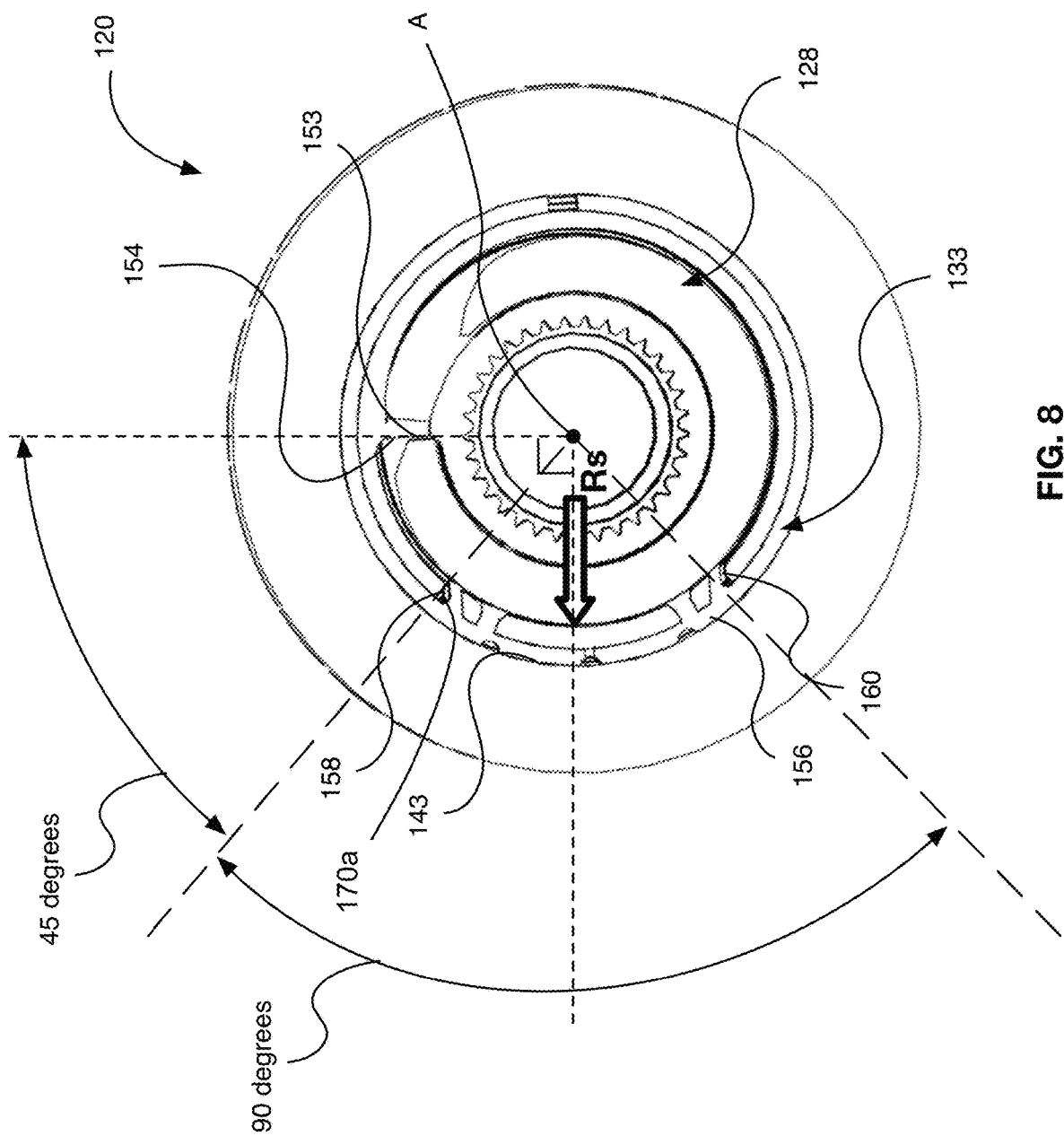
FIG. 8 is a sectional view of the decoupler of FIG. 3, taken along cross-section lines B-B shown in FIG. 6.
Figure 9B:
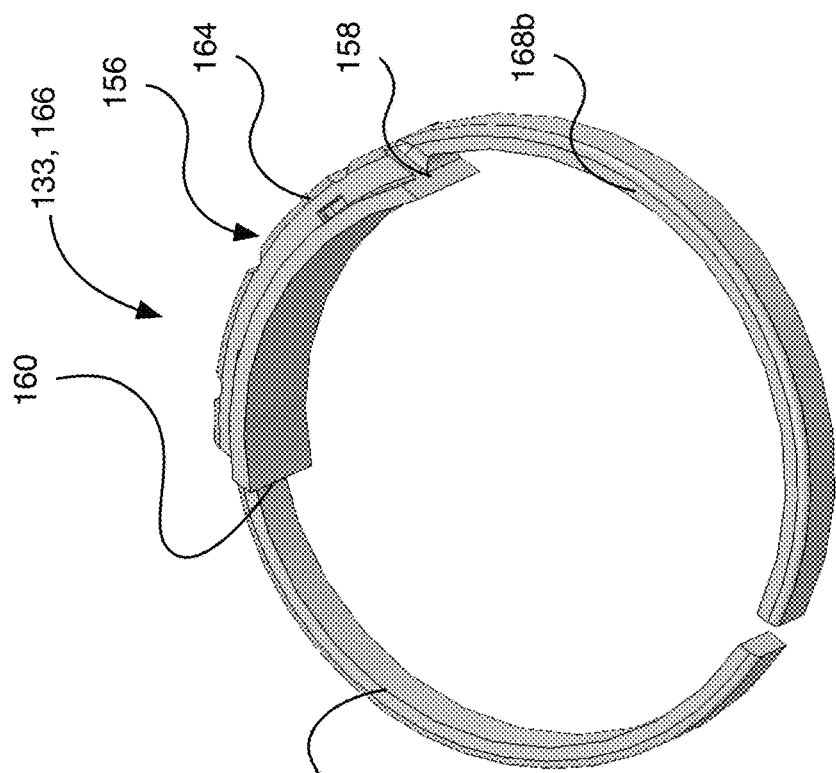
FIGS. 9A and 9B are perspective views of a damping member in isolation of the decoupler of FIG. 3.
Figure 9A:
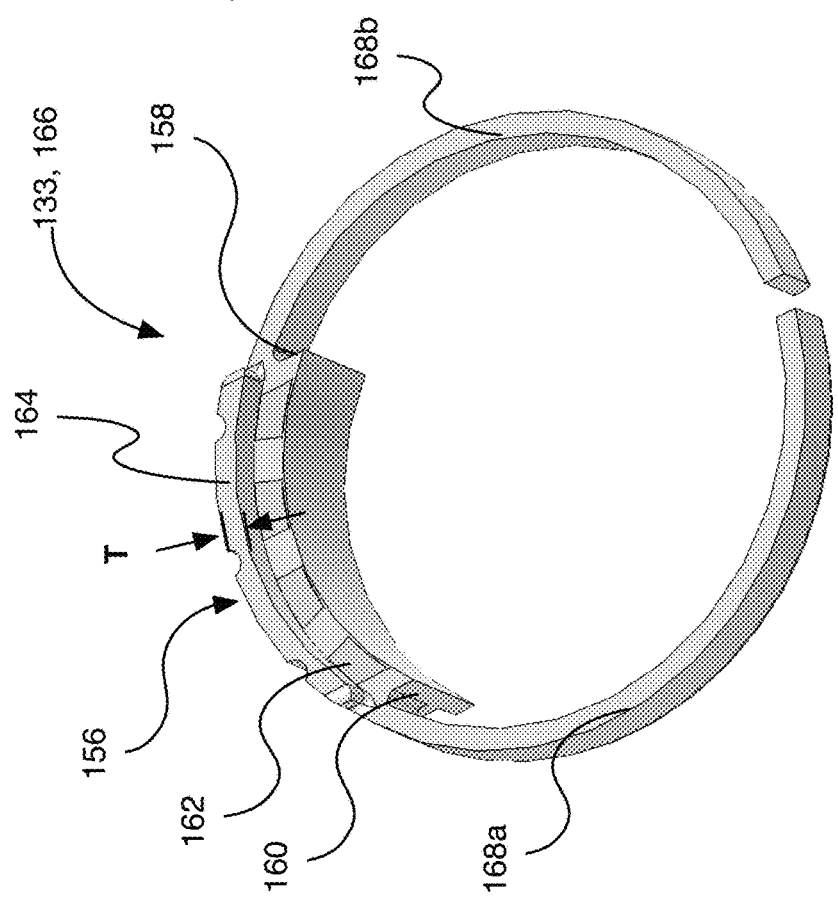

As stated above, the decoupler 120 includes the damping member 133. The damping member 133 is positioned to be driven into frictional engagement with a friction surface on one of the pulley 124 and the hub 122, such as the inner surface 143 of the pulley 124, by a force from the isolation spring 128 that acts on the damping member 133 and that varies based on the rotational load transferred by the isolation spring 128 between the pulley 124 and the hub 122, such as the radial reaction force, Rs. For example, as shown in FIG. 7, the damping member 133 is located radially between the isolation spring 128 and the friction surface 143, and is circumferentially aligned with the radial reaction force, Rs (i.e. the damping member 133 is positioned at a suitable angular position for receiving the radial reaction force Rs from the spring 128). In contrast to typical decouplers, the damping member 133 directly bears the radial reaction force, Rs. This radial reaction force, Rs, generated by the isolation spring 128 then urges the damping member 133 onto the friction surface 143. A normal reaction force from the pulley, Rp, is generated in response to the radial reaction force, Rs. Because the damping member 133 is positioned in the engagement opening 170, the damping member 133 is constrained to rotate with the hub 122 (by engagement of the first circumferential end 158 of the damping member 133 with an edge 170a (FIG. 8) of the engagement opening 170), and therefore slides relative to the inner pulley surface 143, a frictional force, Fd, (and, hence, a damping torque, Dt) is transmitted from the pulley 124 to the damping member 133 (and then from the damping member 133 into the hub 122). The frictional engagement between the inner pulley surface 143 and the damping member 133 provides another torque path shown at 199a through the decoupler 120.

In some embodiments, the damping member 133 includes a circumferential pad 156 (see FIGS. 7 to 9B) that is radially offset from the second helical end 153 of the isolation spring 128 such that the radial reaction force, Rs, is received by the circumferential pad 156. For example, the circumferential pad 156 can include a first circumferential end 158 that is radially offset from the second helical end 153 of the isolation spring 128 by about 45 degrees and a second circumferential end 160 that is about 90 degrees from the first circumferential end 158. However, any radial width between the first circumferential end 158 and the second circumferential end 160 that is suitable to provide a surface of the damping member 133 to receive the radial reaction force, Rs, to urge the damping member into the friction surface, inner surface 143 in the example decoupler 120, is contemplated.

The damping member 133 can include a metallic supporting structure 162 and a plastic wear element 164. In the damping member 133, at least a portion of the plastic wear element 164 is part of the circumferential pad 156. The damping element 133 can have a wear thickness, T, that is based on a selected number of duty cycles of an engine crankshaft that is to be operatively coupled to the endless power transmitting member, such as the crankshaft 102 and belt 104. In some embodiments, the wear thickness, T, is the thickness of the plastic wear element 164.

In some embodiments, the decoupler 120 includes a second bearing member 166 that is configured to support the pulley 124 on the hub 122, and that is contiguous with the damping member 133 (e.g., the damping member 133 and the second bearing member 166 may be integral with one another). In the example decoupler 120, the second bearing member 166 is a bushing that includes bushing portions 168a, 168b coupled to the circumferential pad 156 to form a combined damping member 133 and second bearing member 166. However, in some embodiments, the second bearing member 166 is provided as a separate and distinct component from the damping member 133.

In some embodiments, the damping member 133 is seated at least partially within an engagement opening 170 (FIG. 5) in the hub 122. In the example decoupler 120, the engagement opening 170 is a cutout in the hub 122. However, any opening in the hub 122 that is suitable for at least partially retaining the damping member 133 is contemplated. In some embodiments, the wear thickness, T, gradually wears thinner over the operating life of the engine. Eventually, the wear thickness, T, will be low enough for the isolation spring 128 to contact the hub 122 at one or more of the edges 176a and 176b of the engagement opening 170, bypassing the damping member 133 to directly transfer the rotational load to the hub 122.

By including a movable damping member, such as the damping member 133, that is positioned to receive the radial reaction force, Rs, it is possible to transfer the radial reaction force, Rs, to the pulley 124, resulting in a damped decoupler. The damping provided by the damping member 133 is in addition to the damping that is usually provided by general interference between components, surface treatments or coatings, and material properties of the component. However, the damping provided by the damping member 133 is based on and, in the examples shown in the figures, proportional to, the rotational load transferred by the isolation spring 128 between the pulley 124 and the hub 122. As a result, the more rotational load being transferred by the isolation spring 128, the greater the damping (and the greater the damping torque, Dt) provided by the damping member 133. In some tests conducted by the applicant, the damping level achieved by the described decoupler was between 10 to 40 percent of the rotational load transferred by the isolation spring 128. Furthermore, the damping member 133 does not provide any additional damping when the hub 122 overruns the pulley 124, since the one-way clutch 131 disengages the pulley 124 from the hub 122, leaving only a small amount of frictional engagement between the one-way clutch 131 and the pulley 124. As a result, only a small rotational load is being transferred by the isolation spring 128. In other words, the damping being applied is low in a situation where low damping is desirable, such as when the hub 122 overruns the pulley 124.

Furthermore, in some embodiments, there will be at least some clearance between the first circumferential end 158 and the edge 176a, and between the second circumferential end 160 and the edge 176b. These clearances permit some relative movement between the hub 122 and the pulley 124 without necessarily causing relative movement of the damping member 133 and the pulley 124, and therefore without causing damping via the damping member 133. The amount of relative movement can be selected to accommodate a selected amount of torsional vibration, such as the amount of torsional vibration that occurs during a firing pulse of the engine 100 under steady state conditions.

FIG. 10A depicts a torque/displacement hysteresis loop 172 of a test decoupler that is configured similarly to the decoupler 120. It will be understood that the upper portion (shown at 172a) of the curve 172 represents the torque transferred by the isolation spring during an increase in the angular displacement between the hub and the pulley. The lower portion (shown at 172b) of the curve 172 represents the torque transferred by the isolation spring during an decrease in the angular displacement between the hub and the pulley. With reference to FIG. 10A, the damping torque is the difference in the values between the upper portion shown at 172a of the hysteresis loop 172 and the lower portion 172b of the loop 172 at any given angular displacement. This difference is denoted by W. As can be seen, the difference W, and therefore the damping torque Dt, generally increases based on the angular displacement between the hub and the pulley. As will be understood, the rotational load transferred by the isolation spring increases with the angular displacement between the hub and the pulley. Therefore, the damping torque increases in proportion to the rotational load transferred by the isolation spring.

FIG. 10B depicts a graph of overrun torque versus displacement in degrees. As can be seen, the overrunning torque remains low during overrun. The low overrunning torque is due to the isolation spring transferring only a small amount of rotational load between the pulley and the hub during overrun due to the small frictional force between the wrap spring clutch 132 and the pulley 124. The small overrunning torque results in a small radial reaction force, Rs, which generates a small damping torque. As a result, including a damping member such as the damping member 133, does not, in some embodiments, undesirably interfere with the ability of the decoupler to disengage the pulley from the hub during when in an overrunning condition.

Figures 11A, 11B:
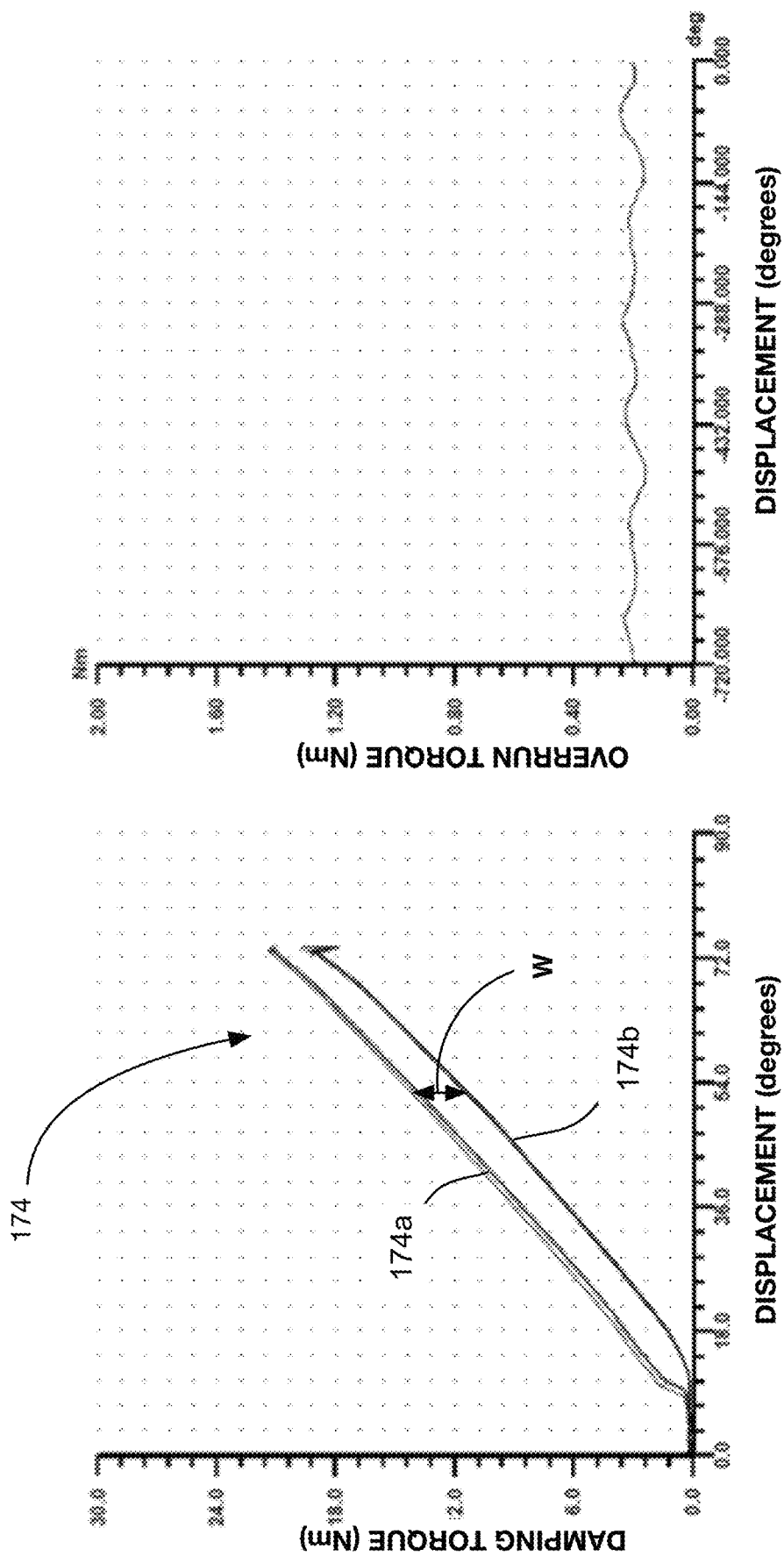
FIG. 11A is a hysteresis loop of damping torque versus angular displacement of a typical, prior art decoupler.
FIG. 11B is a graph of overrun torque versus displacement in degrees of the decoupler of FIG. 11A.

FIGS. 11A and 11B depict a hysteresis loop 174 and a graph of overrun torque versus displacement for a decoupler without the additional, variable damping torque provided by the damping member. As shown in FIG. 11A, the damping torque (and the width, W) remains constant as the rotational load transferred by the isolation spring increases. In other words, the damping torque in FIGS. 11A and 11B is constant and present even when undesirable, such as during overrunning.

Figure 12:
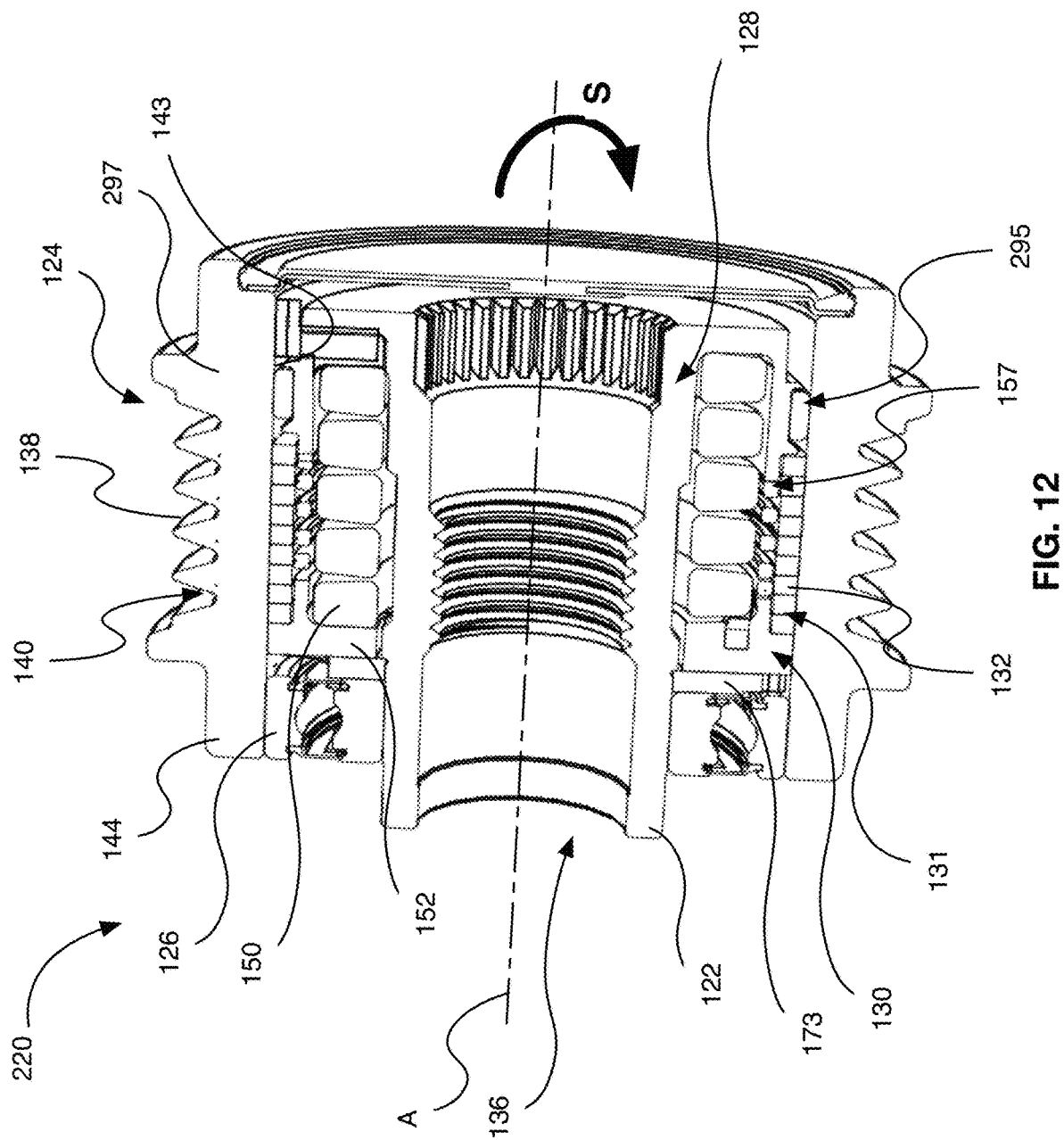
FIG. 12 is a cross-section view of a decoupler according to another set of non-limiting embodiments of the present disclosure.
Figure 13:
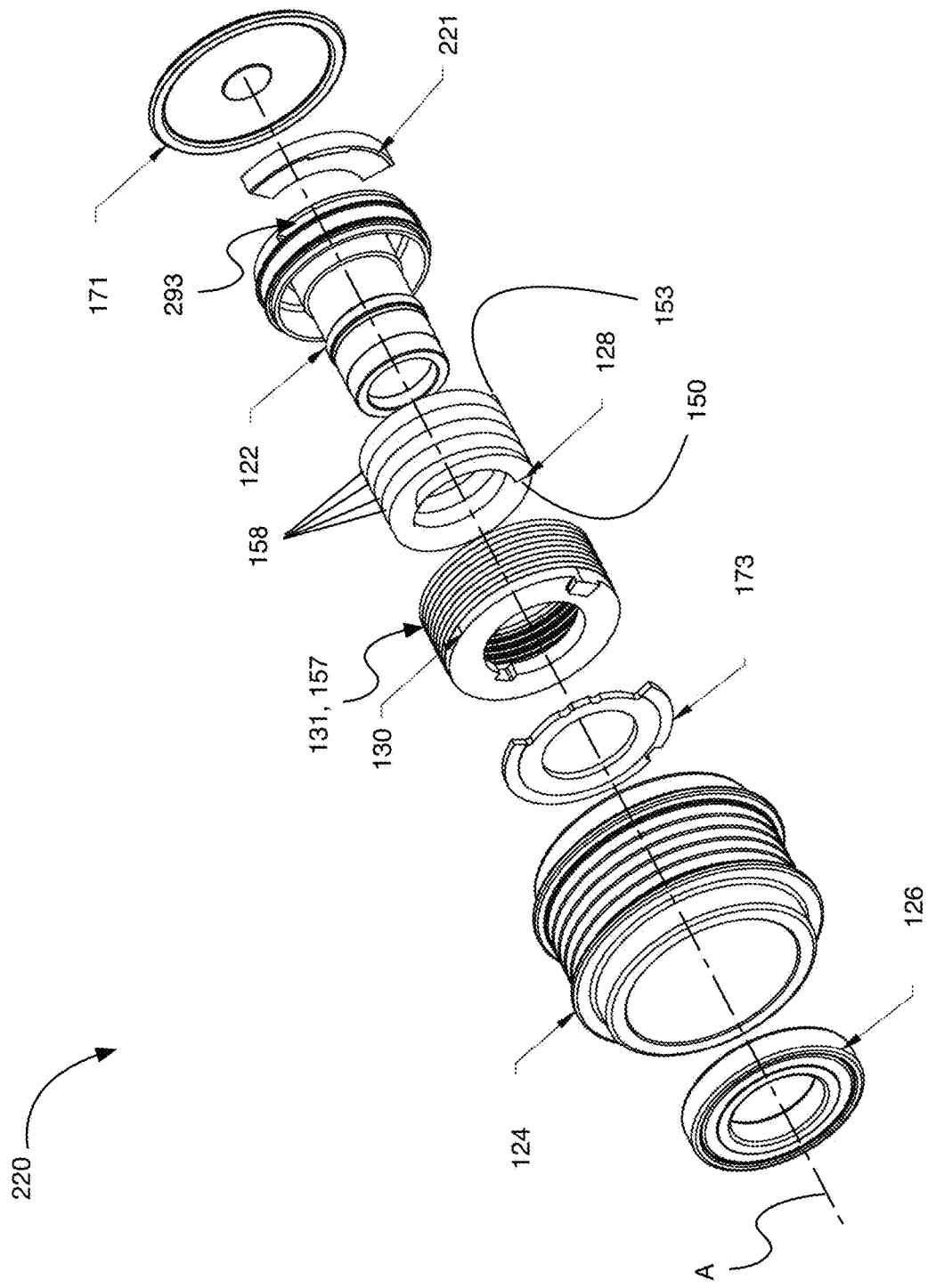
FIG. 13 is an exploded view in a first perspective of the decoupler of FIG. 12.
Figure 14:
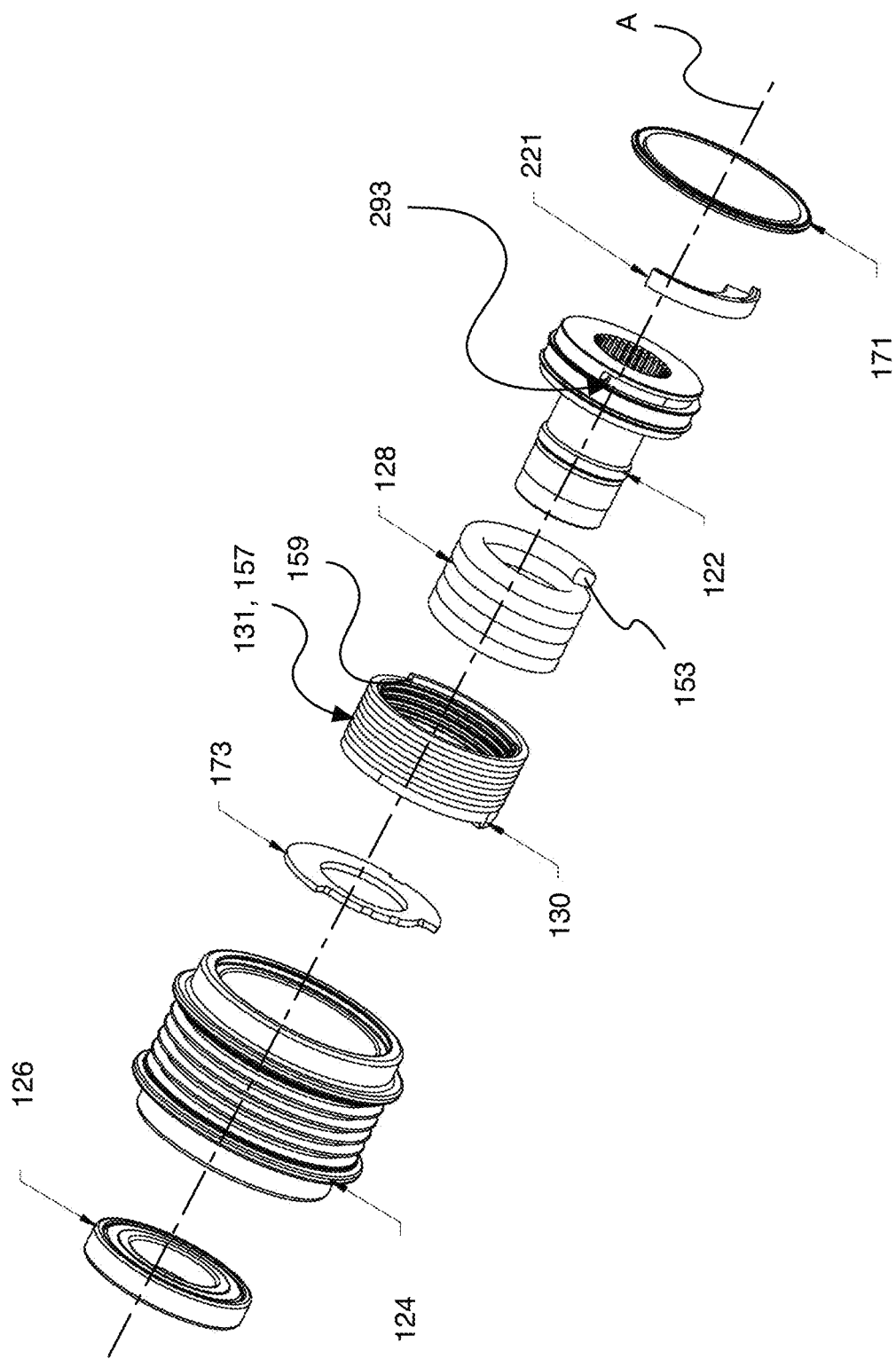
FIG. 14 is an exploded view in a second perspective of the decoupler of FIG. 12.
Figure 15:
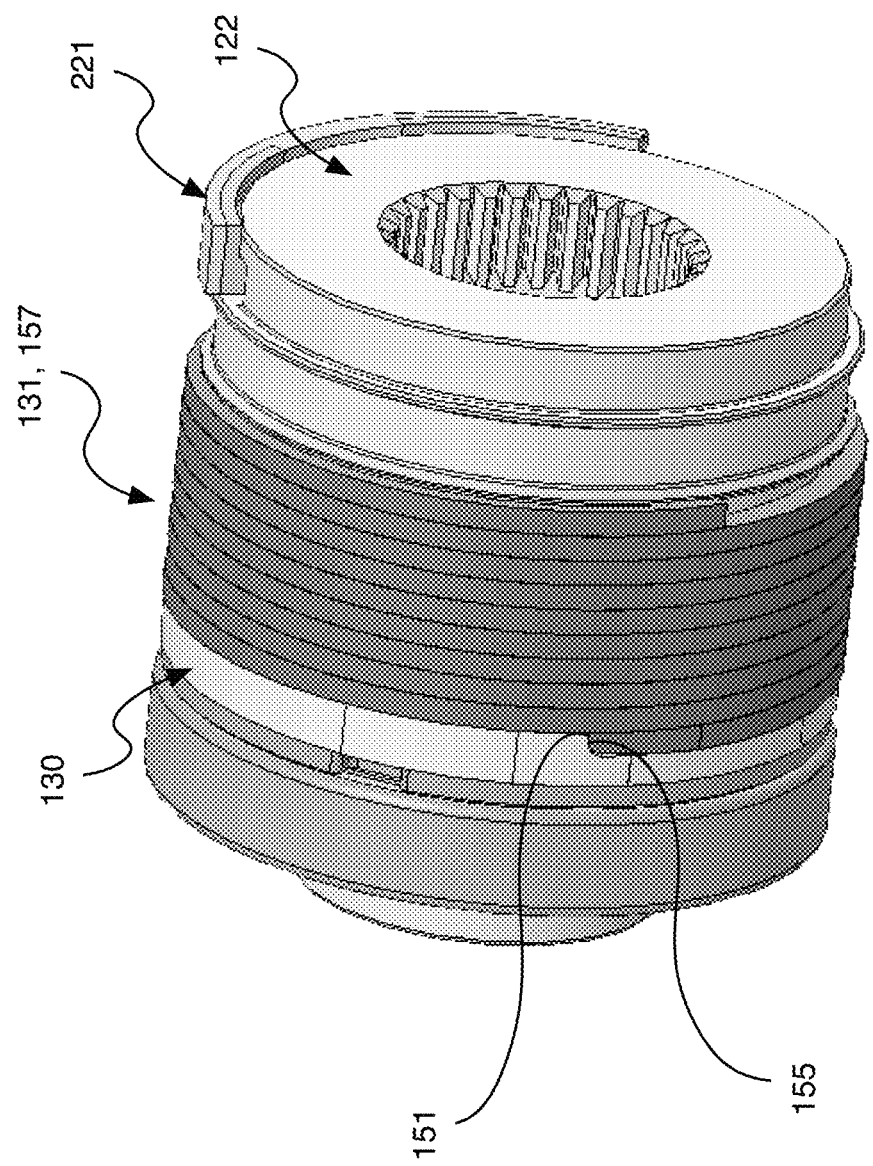
FIG. 15 is a perspective view of the decoupler of FIG. 12 without the pulley and the seal cap to better show the engagement between the first end of the wrap spring clutch and the radial wall of the carrier.

FIG. 12 depicts a cross-section of another example decoupler 220. The decoupler 220 includes at least some components that are similar to the example decoupler 120, which are indicated by like numbers. FIGS. 13 and 14 depict exploded views of the decoupler 220. FIG. 15 depicts the decoupler 220 without the pulley 124 and the seal cap 171 to better show the engagement between the first end 151 of the wrap spring clutch 132 and the radial wall 155 of the carrier 130.

The decoupler 220 also includes a damping member 221 that is positioned to be driven into frictional engagement with a friction surface on one of the pulley 124 and the hub 122 by a force from the isolation spring 128 acting on the damping member 221 that varies based on the rotational load transferred by the isolation spring 128. As described further below, in the decoupler 221, the force from the isolation spring 128 is a vector portion of a magnitude of the rotational load transferred between the isolation spring 128 and the hub 122 via the damping element 221.

Figure 16:
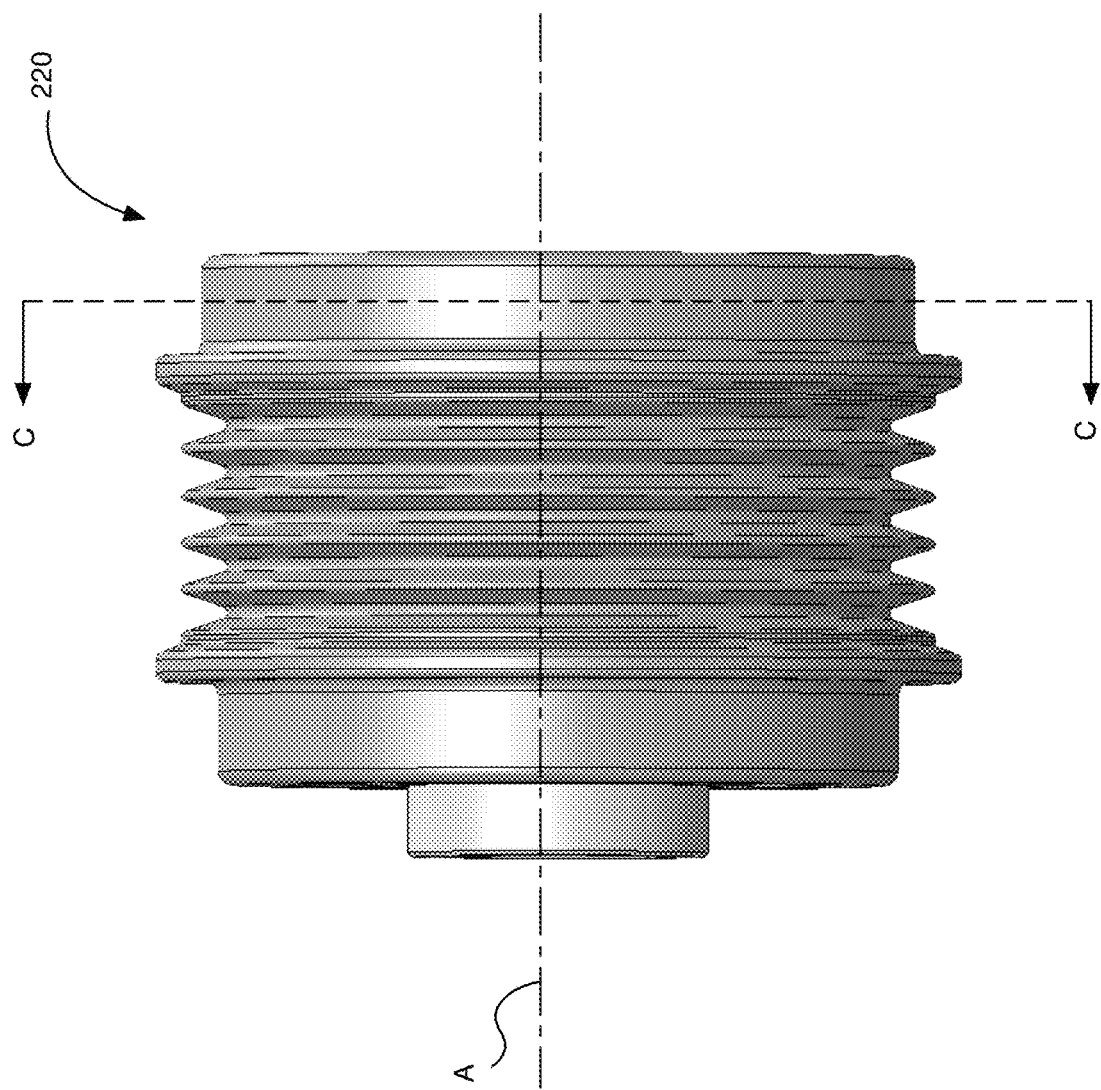
FIG. 16 is a side elevation view of the decoupler of FIG. 12.
Figure 17:
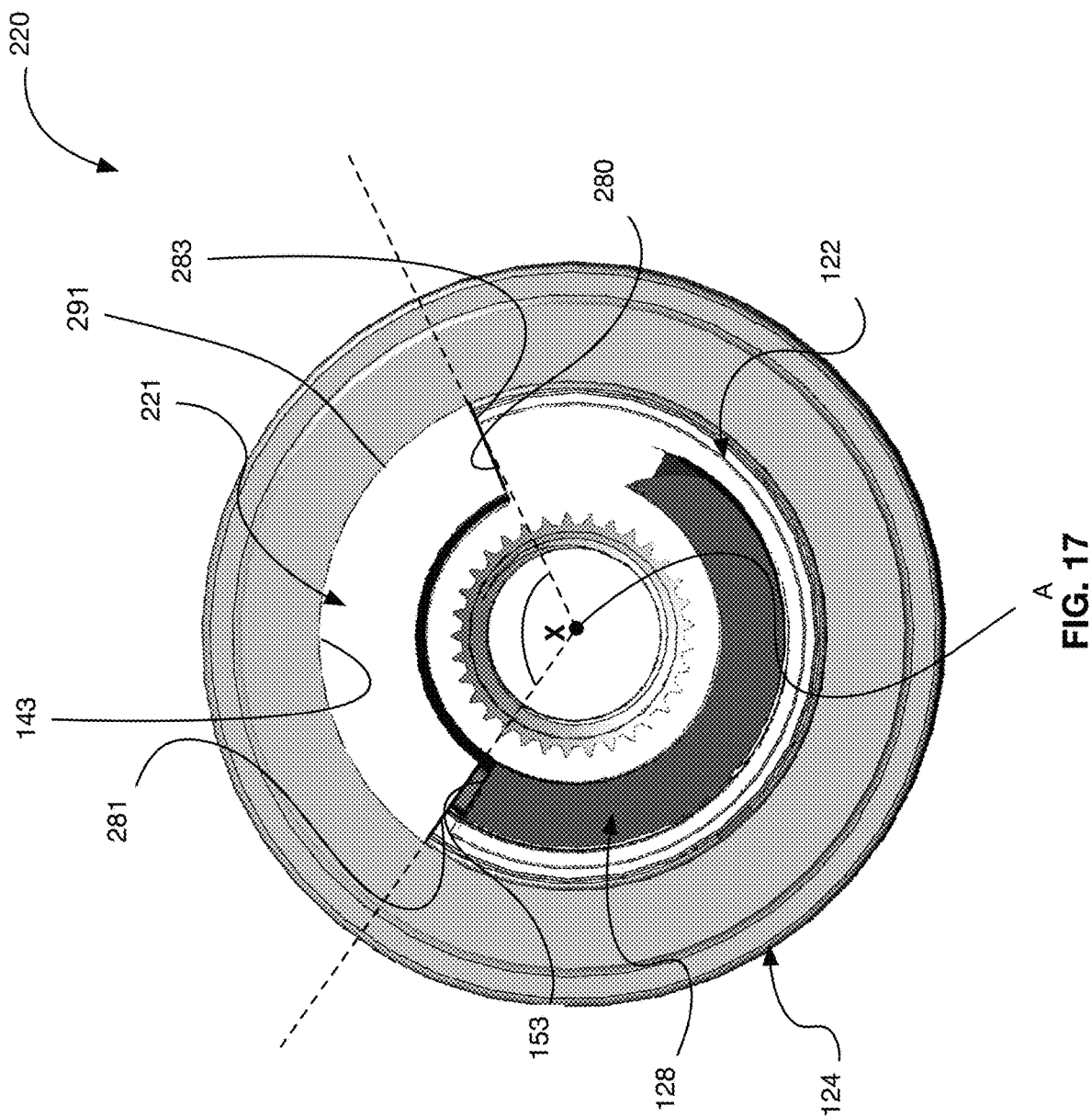
FIG. 17 is a sectional view of the decoupler of FIG. 12, taken along cross-section lines C-C shown in FIG. 16.

Referring to FIG. 17, which depicts a cross section of the decoupler 220 at section C-C (FIG. 16), as in the example decoupler 120, the isolation spring 128 of the decoupler 220 is a helical torsion spring having a first helical end 150 (FIG. 13) and a second helical end 153 (FIG. 17), through which rotational load is transferred to the hub 122 (via the damping member 221). In contrast to the decoupler 120, the damping member 221 is circumferentially between the second helical end 153 and an engagement surface 280 on the hub 122. As the isolation spring 128 transfers rotational load from the pulley 124, the second helical end 153 is driven to abut a first end 281 of the damping member 221 that is configured to engage the second helical end 153. A second end 283 of the damping member 221 that is radially offset from the first end 281 of the damping member 221 by an angular width, X, engages the engagement surface 280 on the hub 122 and at least a portion of the rotational load is transferred to the hub 122.

Figure 18:
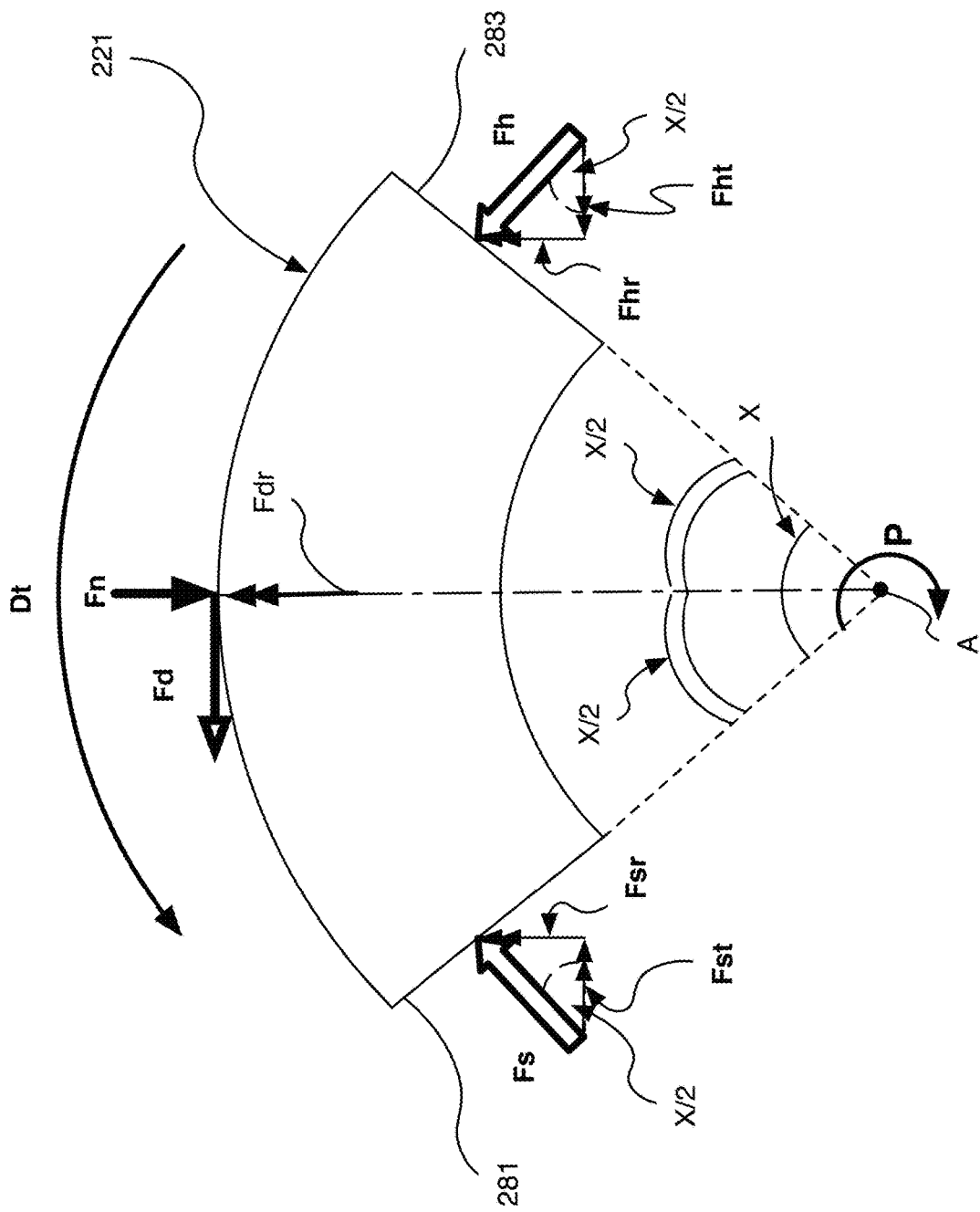
FIG. 18 is a side elevation view of a damping member of the decoupler in FIG. 12, showing the forces acting on the damping member.

FIG. 18 is a free body diagram of the damping element 221. As stated above, when the isolation spring 128 transfers rotational load from the pulley 124, which is rotating in the direction of rotation, P, the isolation spring 128 applies a force, Fs, based on the rotational load, to the damping member 221 at the first end 281. Since the damping member 221 abuts the hub 122 at the engagement surface 280, the hub 122 applies a corresponding reaction force, Fh, against the second end 283. The damping member 221 is urged radially towards the friction surface, which in the example decoupler 220 is the inner pulley surface 143 of the pulley 124, by a vector portion of the force Fs, the radial vector portion Fsr, and of the force Fh, the radial vector portion Fhr. It is understood, that at equilibrium, the magnitude of the force Fh is the same as the magnitude of the force Fs, since Fh is generated in response to the force Fs.

The damping member 221 has an angular width, X, between the first end 281 and the second end 283. The angular width can be expressed in degrees. Based on the radial geometry, the radial vector portion Fsr is approximately $Fs*\sin(X/2)$ and the radial vector portion Fhr is approximately $Fh*\sin(X/2)$. The radial vector portions Fsr and Fhr urge the damping member 221 to move radially towards, and into frictional engagement with, the inner pulley surface 143 with a total vector sum force, Fdr. The presence of the force Fdr results in the pulley 124 applying a normal reaction force, Fn on the damping member 221. Since the damping member 221 slides against the inner pulley surface 143, a frictional damping force, Fd, (along with a damping torque, Dt) is generated to resist the rotation of the pulley 124 in the direction P.

As the angular width, X, increases, the vector portion of the force Fs (and thus of the rotational load transferred by the isolation spring 128) increases and vice versa. The remaining vector portion of forces Fs, Fst, is transmitted through the damping member 221 to the hub 122 to drive the shaft 105 of the accessory. It will be understood, as the angular width, X, increases, the force Fst decreases and vice versa. Hence, the force Fs (and the force Fh) is variable based on the angular width, X. Since the frictional damping force Fd is variable based on the rotational load transferred by the isolation spring 128, and hence, Fs, it will be understood that the frictional damping force Fd is also variable based on the angular width, X, of the damping member 221. According to some embodiments, the force on the damping member 221 from the isolation spring 128 that urges the damping member 221 into frictional engagement with the inner pulley surface 143, the force Fdr, varies in proportion to the rotational load transferred by the isolation spring 128 from the pulley 124.

Figure 19:
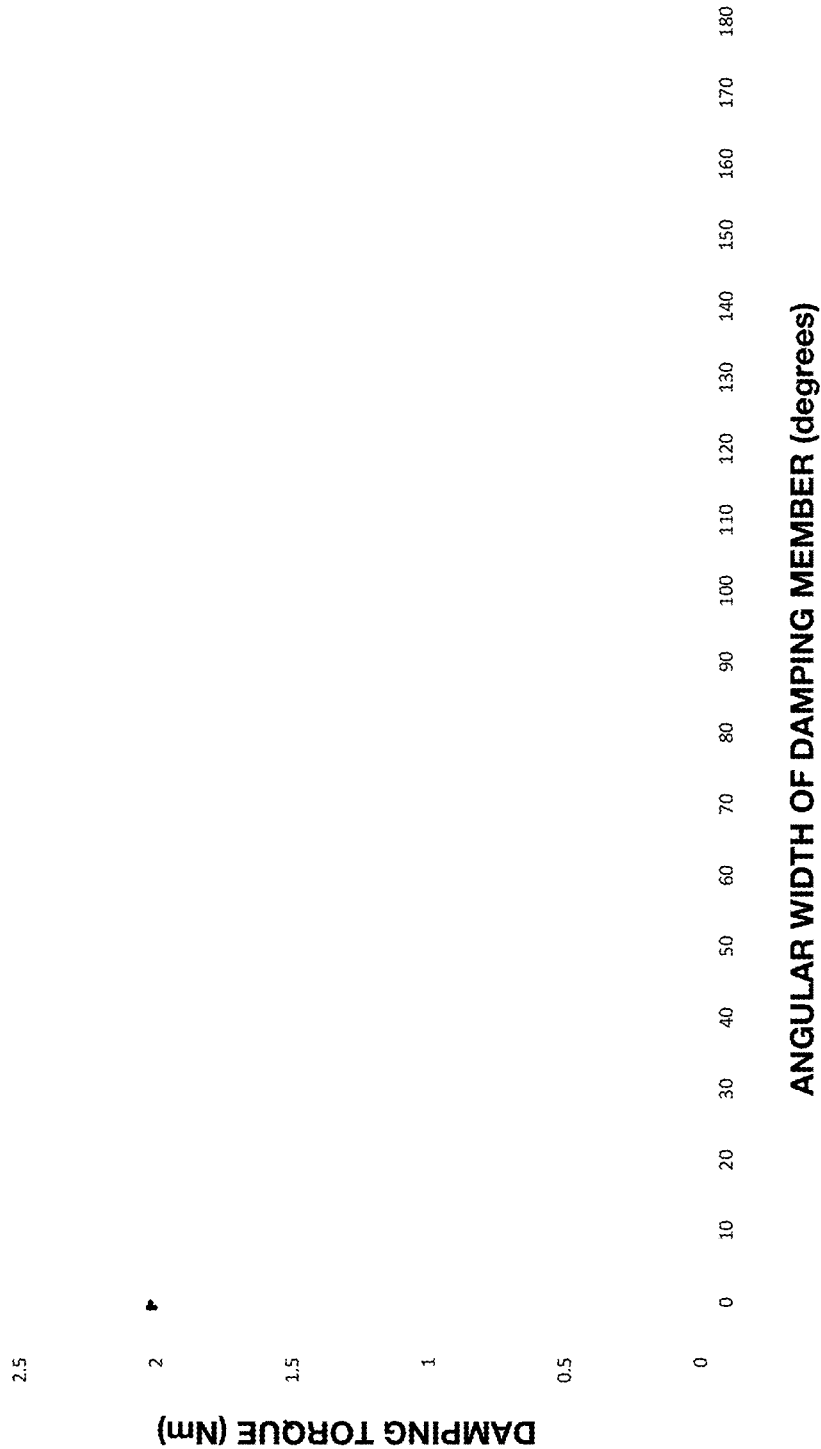
FIG. 19 is a graph of the damping torque versus the angular width of a test damping member configured similarly to the damping member of the decoupler of FIG. 12.

Tests were run on a decoupler that was similarly configured to the decoupler 220 and including a damping member that was similarly configured to the damping member 221. FIG. 19 depicts a graph of the damping torque, Dt, versus the angular width, X, of the test damping member. As shown in FIG. 19, as the angular width of the test damping member was increased, the damping torque, Dt, produced also increased.

Although the angular width, X, can be adjusted, given that friction is usually present between the first end 281 and the second helical end 153, and between the second end 283 and the engagement surface 280 of the hub 122, in some embodiments, there may be an undesirable "wedging" at lower angular widths during operation of the decoupler 220. For example, at lower angular widths, X, such as below 90 degrees, the friction between these surfaces may initially resist the force, Fdr, wedging the damping member 221 between the second helical end 283 and the engagement surface 280, such that no damping occurs via the damping member 221. Accordingly, in some embodiments, the angular width, X, is greater than about 90 degrees.

However, by reducing the magnitude of the resistive frictional forces at the first end 281 and the second end 283, by, for example, applying surface treatments or coatings at one or more of the first end 281, the second helical end 153, the second end 283 and the engagement surface 280, angular widths, X, below 90 degrees may be used to achieve a damping force Fdr that is proportional to the rotational load being transferred by the isolation spring 128.

In some embodiments, at larger angular widths, X, such as above about 180 degrees, the magnitude of the force, Fst, that is transmitted via the damping member 221 to the hub 122 falls below a magnitude to drive rotation of the hub 122, and therefore the shaft 105. Accordingly, in some embodiments, the angular width, X, is less than about 180 degrees. Further, in some embodiments the angular width, X, is between about 90 degrees and about 180 degrees.

Similarly to the example decoupler 120, in some tests conducted by the applicant, the amount of damping that was achieved by decouplers that were configured similarly to the decoupler 220 was between 10 to 40 percent of the rotational load transferred by the isolation spring 128. As in the embodiment shown in FIGS. 3-9B, the damping member 221 only provides a small amount of damping when the hub 122 overruns the pulley 124.

Figure 20B:
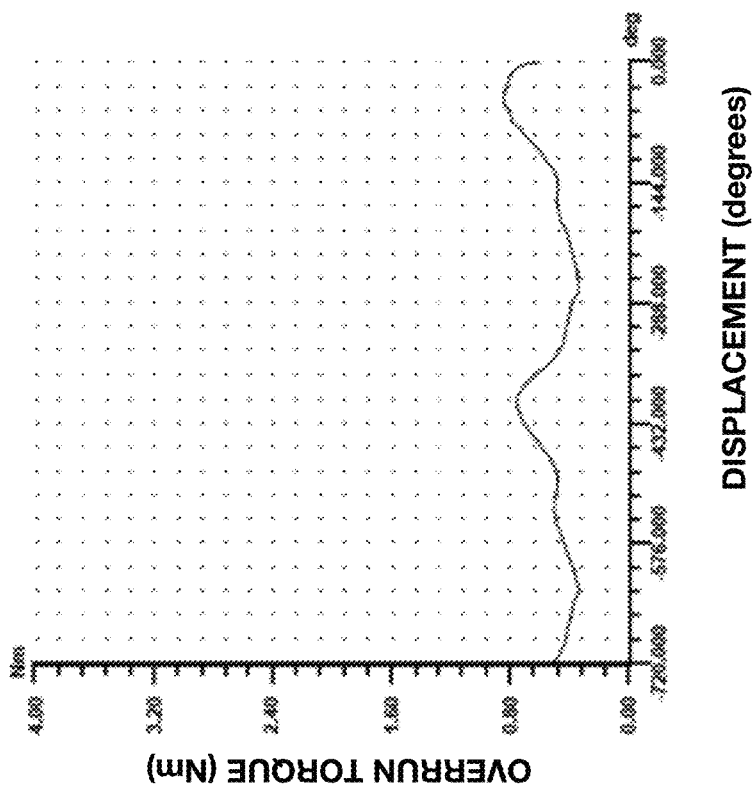
FIG. 20B is a graph of overrun torque versus displacement in degrees of the decoupler of FIG. 20A.
Figure 20A:
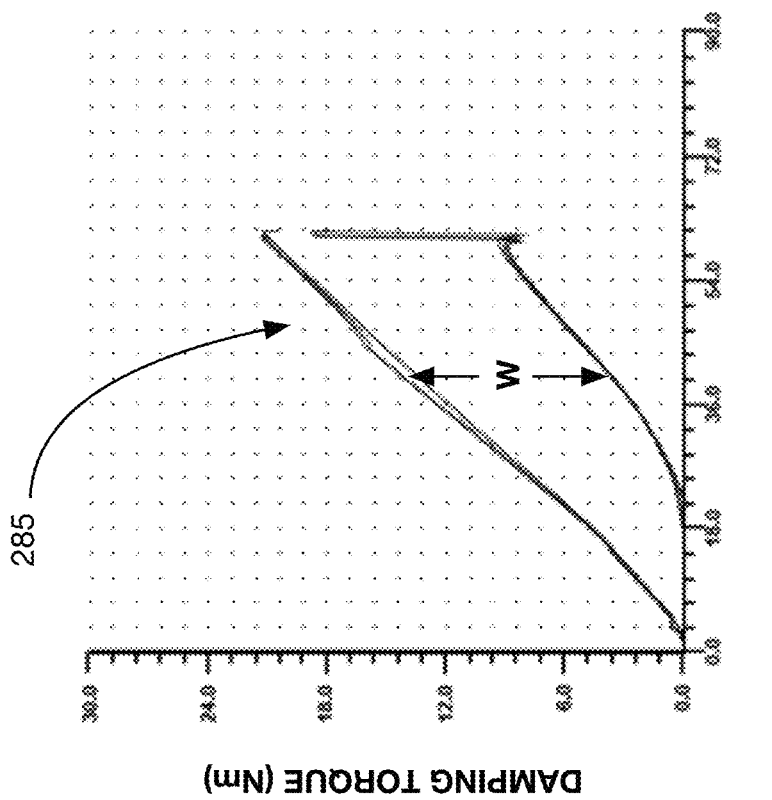
FIG. 20A is a hysteresis loop of damping torque versus angular displacement of a decoupler configured similarly to the decoupler of FIG. 12.

FIG. 20A depicts a hysteresis loop 285 of a test decoupler that is configured similarly to the decoupler 220. In similar manner to the hysteresis loop 172 shown in FIG. 10A, the damping torque, which is represented by the width, W, of the hysteresis loop 285 generally increases as the rotational load transferred by the isolation spring increases. In the particular test decoupler that was tested, the damping torque increases in proportion to the rotational load transferred by the isolation spring.

FIG. 20B depicts a graph of overrun torque versus displacement in degrees. As shown, the overrunning torque remains low during overrun. The low overrunning torque is due to the isolation spring transferring only a relatively small rotational load between the pulley and the hub during overrun. Without the force, Fs, from the isolation spring the damping element is not urged into frictional contact with the friction surface to generate a damping torque. As a result, including a damping member, such as the damping member 221, may not undesirably interfere with the ability of the decoupler to disengage the pulley from the hub.

Figure 22:
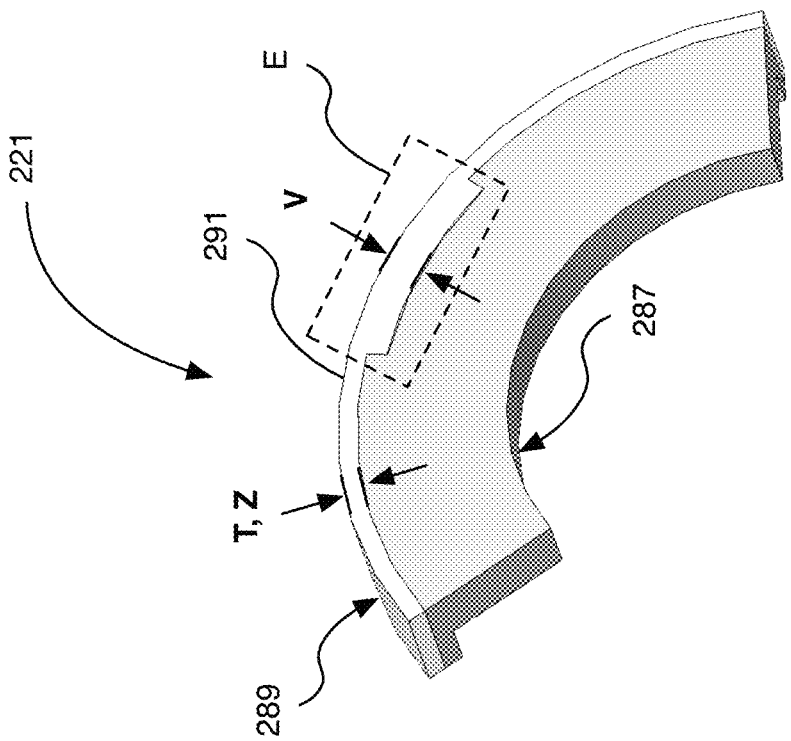
FIGS. 21 and 22 are perspective views of a damping member in isolation of the decoupler of FIG. 12.
Figure 21:
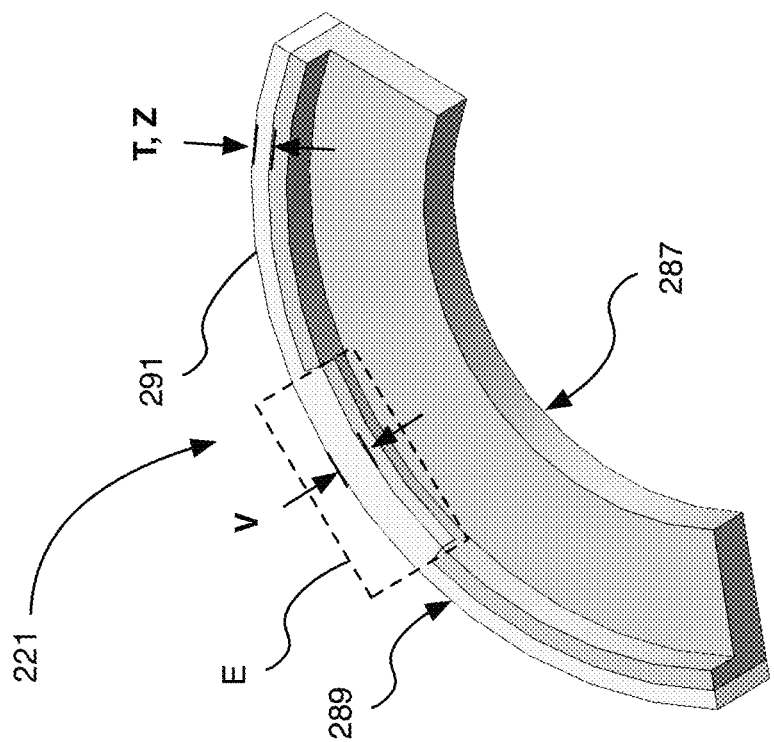

FIGS. 21 and 22 depict perspective views of the damping member 221 in isolation. The damping member 221 can include a metallic load transfer element 287 and a plastic wear element 289 having a wear surface 291. The metallic load transfer element 287 is configured to transfer at least a portion of the rotational load from the isolation spring 128 to the hub 122. For example, the metallic load transfer element 287 can be the surface of the first end 281 of the damping member 221 that the second helical end 153 abuts as the isolation spring 128 transfers rotational load from the pulley 124. However, any configuration of the metallic load transfer element 287 that will transfer at least a portion of the rotational load from the isolation spring 128, such as the radial vector portion Fsr of the force Fs, is contemplated. In some embodiments, the metallic load element 287 is manufactured from steel. The plastic wear element 289, is configured to frictionally engage the friction surface, such as the inner pulley surface 143, along at least a portion of the wear surface 291 and is manufactured from any suitable plastic material. The plastic wear element 289 has a wear thickness, T. In some embodiments, the wear thickness, T, is not uniform over the entire wear surface 291. For example, as shown in FIGS. 22A and 22B, the amount of wear thickness, T, may be a value of V (expressed in, for example, millimeters) at a region, E, of the wear surface 291 and a value of Z (expressed in, for example, millimeters) outside region, E. In some embodiments, the wear thickness, T, is based on a selected number of duty cycles of an engine crankshaft that is to be operatively coupled to the endless power transmitting member, such as the crankshaft 102 and belt 104.

In some embodiments, the engagement surface 280 of the hub 122 is a surface of a circumferential slot 293 (FIGS. 13, 14) in the hub 122. The circumferential slot 293 is configured to receive at least a portion of the damping member 221 therein such that the second end 283 of the damping member 221 can abut the engagement surface 280 on the hub 122.

As shown in FIG. 12, the decoupler 220 may include a second bearing member 295 that is configured to support the pulley 124 on the hub at a second end 297 of the pulley 124. In some embodiments, the second bearing member 295 is a bushing (as shown). However, the second bearing member 295 may be any other bearing member that is suitable for supporting the pulley 124 on the hub 122 at the second end 297 is contemplated.

In some embodiments, the configuration of the damping member 221 may yield some advantages over the damping member 133. For example, as stated above, for the damping member 133 there will be at least some clearance between the first circumferential end 158 and the edge 176a, and between the second circumferential end 160 and the edge 176b for assembly purposes. These clearances provide additional movement of the damping member 133 relative to the friction surface, such as the inner pulley surface 143, for every firing pulse of the engine. In contrast, since the damping member 221 is circumferentially between the second helical end 153 of the isolation spring 128 and the engagement surface 280, when the isolation spring 128 is transferring rotational load from the pulley 124, the second helical end 153 moves to fill any clearance space between it and the first end 281 of the damping member 221 to abut the first end 281. In transferring at least a portion of the rotational load from the isolation spring 128, the second end 283 of the damping member 221 abuts the engagement surface 280 of the hub 122, removing any clearance between the second end 283 and the engagement surface 280. As a result, when the isolation spring 128 is transferring rotational load from the pulley 124 to the hub 122 (via the damping member 221), any clearance or tolerance spaces between the isolation spring 128, the damping member 221 and the hub 122 at the surfaces or faces where they abut are eliminated. By eliminating the clearances between the isolation spring 128, the damping member 221 and the hub 122, unnecessary movement of the damping member 221 is reduced and unnecessary wear on the damping member 221 (at the wear surface 291, for example) is also reduced. As a result, in at least some embodiments, the damping member 221 may have a longer wear life than the damping member 133.

However, it is understood that when the isolation spring 128 is not transferring a rotational load from the pulley 124, such as during an overrun event when the hub 122 overruns the pulley 124, the clearance between the second helical end 153 of the isolation 128 and the first end 281 of the damping member 221 likely remains.

Furthermore, given the space constraints on some decouplers on some engines, by placing the damping member circumferentially in series with a helical end of the isolation spring and the hub, such as in the decoupler 220, instead of than radially in series, such as in the decoupler 120, it may be possible for the decoupler 220 to fit in some applications in which the decoupler 120 would not fit. Similarly, it may be possible for the decoupler 120 to fit in some applications that the decoupler 22 would not fit. In addition, in some embodiments, at least some of the radial clearance between the isolation spring 128 and the pulley 124 can be utilized to increase the wear thickness, T, of the plastic wear element 289 to increase the operating life of the damping member 221.

FIG. 23 depicts a block diagram of an engine 317 including a typical decoupler 319 without the additional, variable damping that is provided by the damping member 133 and 221. The engine 317 can be an internal combustion engine. The decoupler 319, as depicted, includes a pulley 301, an isolation spring 303 and a hub 305. Although the decoupler 319 includes other components, such as a one-way clutch and a carrier, for simplicity these and other components are not depicted in FIG. 23. The hub 305 is operatively connected to a drive shaft 307 of an alternator (not shown), which is operatively connected to an alternator regulator 309. The pulley 301 is operatively connected to a crankshaft 313 of the internal combustion engine 317 via an endless power transmitting member 311. An engine control unit 315 (also referred to as the ECU 315) controls the operation of the engine 317 and therefore the crankshaft 313. Accordingly, the ECU 315 may be said to be operatively connected to the crankshaft 313. During some engine conditions, such as low-idle or sub-idle, the alternator regulator 309 may have a switching frequency that is at or near the natural frequency of the isolation spring 303. This switching of the alternator regulator 309 is fed to the isolation spring 303 via the drive shaft 307 (also referred to as the alternator drive shaft 307). In response, the isolation spring 303 may resonate with a large amplitude at its natural frequency. Since the isolation spring 303 is operatively connected to the pulley 301, the resonance of the isolation spring 303 can generate high dynamic torque pulses at the pulley 301. These torque pulses will be multiplied due to the pulley ratio between the pulley 301 and the pulley associated with the crankshaft 313 (not shown) and transmitted to the crankshaft 313 via the endless power transmitting member 311. If the torque pulses are large enough, they can influence the speed of the crankshaft 313 and induce a vibration of the crankshaft 313 of the first order. The ECU 315 may detect the torque pulses and attempt to balance the firing of the pistons in the engine cylinder to address the torque impulses. This can result in greater vibration of the crankshaft 313 of the first order, which is fed back to the pulley 301 via the endless power transmitting member 311, and back to the isolation spring 303, the hub 305, the drive shaft 307 and the alternator regulator 309. The first order vibration may be particularly noticeable by drivers of a vehicle that includes engine 317.

In some cases, instead of the alternator regulator 309, the firing frequency of the pistons in the engine cylinders may induce the resonance of the crankshaft 313, the isolation spring 303 and the pulley 301. For example, the balancing of the firing of the pistons in the cylinders by the ECU 315 during idle engine conditions may lead to a torque pulse that induces first order vibrations in the crankshaft 313. These first order vibrations of the crankshaft 313 can be transmitted, via the endless power transmitting member 311, to the pulley 301 and which are then to the isolation spring 303. The torque pulse can cause resonance in the isolation spring 303 which can be transmitted to the hub 305 to the drive shaft 307 and then to the alternator regulator 309, which may alter its switching frequency in response.

The damping members described herein may prevent, or at least inhibit, this resonance condition between an engine crankshaft and a pulley and isolation spring of a decoupler or isolator. In particular, in some embodiments, the damping torque is sufficient at at least one point in the range to change a resonance condition of the decoupler sufficiently for at least one of an alternator regulator of the alternator to select a new voltage parameter and the engine control unit to select a new firing frequency. More specifically, it is possible that at an upper end of the range, the damping is sufficient to lock at least the pulley, the hub, the damping member and the isolation spring together to change a resonance condition of the decoupler or the isolator sufficient for at least one of an alternator regulator to select a new voltage parameter and an engine control unit to select a new firing frequency.

Figure 24:
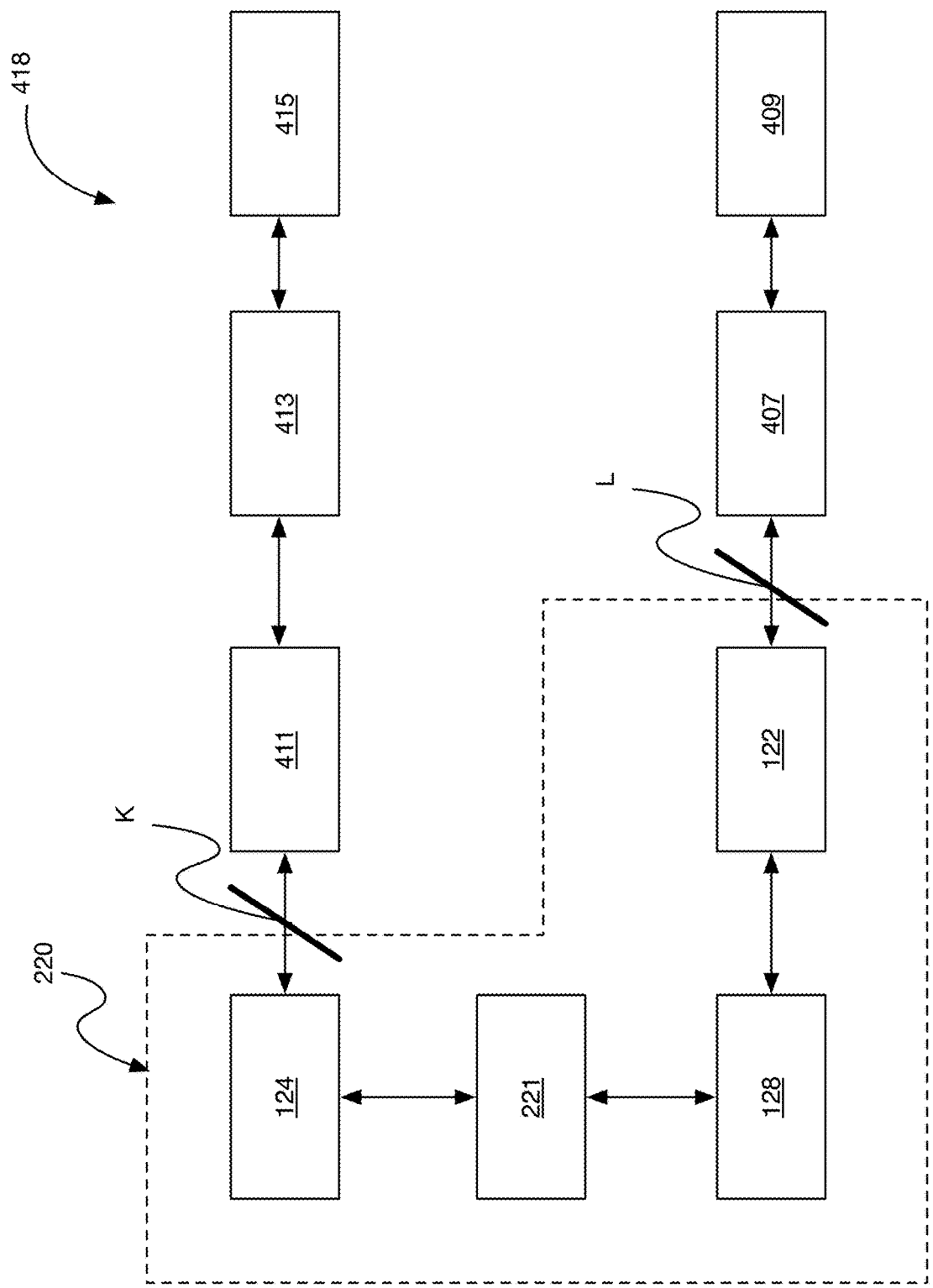
FIG. 24 is a schematic of an engine including the decoupler of FIG. 12.

As an example, FIG. 24 depicts a schematic of an engine 418 including the decoupler 220. An ECU 415 is operatively connected to a crankshaft 413, which is operatively connected to the decoupler 220 via the endless power transmitting member 411. The decoupler 220 is operatively connected to a drive shaft 407 of an alternator that is operatively connected to an alternator regulator 409.

It is theorized that resonance in a typical isolator or decoupler, can arise as a result the event that the alternator regulator 409 begins to switch at the natural frequency of the decoupler 220, or the ECU 415 induces vibrations of a first order in the crankshaft 418, the isolation spring 128 begins to resonate or oscillate at or near its natural frequency. The oscillations of the isolation spring 128 are then fed to the pulley 124 and also to the hub 122 (and to the drive shaft 407).

As stated above, the damping members 221 and 133 provide a damping torque, Dt, that is variable based on the rotational load being transferred by the isolation spring 128. In some embodiments, the damping torque, Dt, is proportional to the rotational load being transferred by the isolation spring 128. As a result of changes in the rotational load, the damping member 221 and the damping member 133 can provide a damping torque over a range of values (also referred to as damping values). In some embodiments, the damping torque is sufficient at at least one point in the range to change a resonance condition of the decoupler sufficiently for at least one of an alternator regulator of the alternator to select a new voltage parameter and the engine control unit to select a new firing frequency. In some further embodiments, at an upper end of the range of damping values, the damping torque provided is sufficient to lock together at least the pulley 124, the hub 122, the damping member 221 and the isolation spring 128, at least temporarily. Locking together the pulley 124, the hub 122, the damping member 221 and the isolation spring 128 prevents at least some mechanical feedback between the alternator regulator 409 and the isolation spring 128 at the location, L, or between the ECU 415 and the isolation spring 128 at the location, K (FIG. 24). As a result, the temporary locking of the pulley 124, the hub 122, the damping member 221 and the isolation spring 128 together, or, more broadly, when the damping torque is sufficient in general, it provides an opportunity for the alternator regulator 409 to obtain new voltage parameters that would change the switching frequency to a value other than the natural frequency of the decoupler 220. In the case where the resonance condition is induced by the ECU 415, the temporary locking of the pulley 124, the hub 122, the damping member 221 and the isolation spring 128 together may provide the ECU 415 with an opportunity to select a new firing frequency for the pistons of the engine cylinders of different than a value that would induce the first order vibrations.

The damping members 133 and 221 described above are included in decouplers that include an isolation spring 128 that opened radially outwards to urge the damping members 133 and 221 into frictional engagement with a friction surface, such as the inner pulley surface 143 of the pulley. However, decouplers or isolators that utilize an isolation spring that contracts or wraps radially inwards in response to transferring rotational load between the pulley and the hub are also contemplated.

Figure 25:
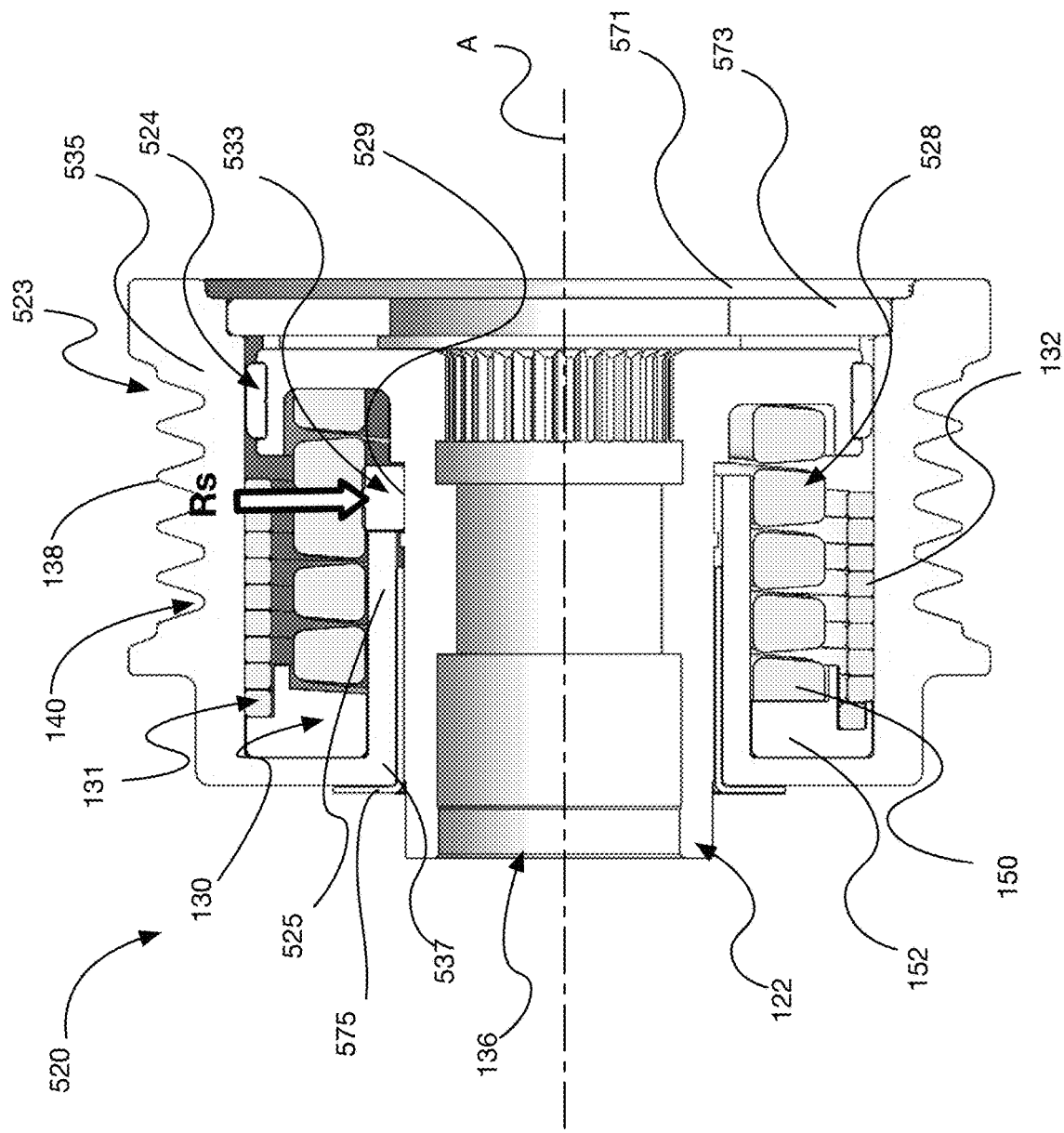
FIG. 25 is a cross-section view of a decoupler according to another set of non-limiting embodiments of the present disclosure.
Figure 26:
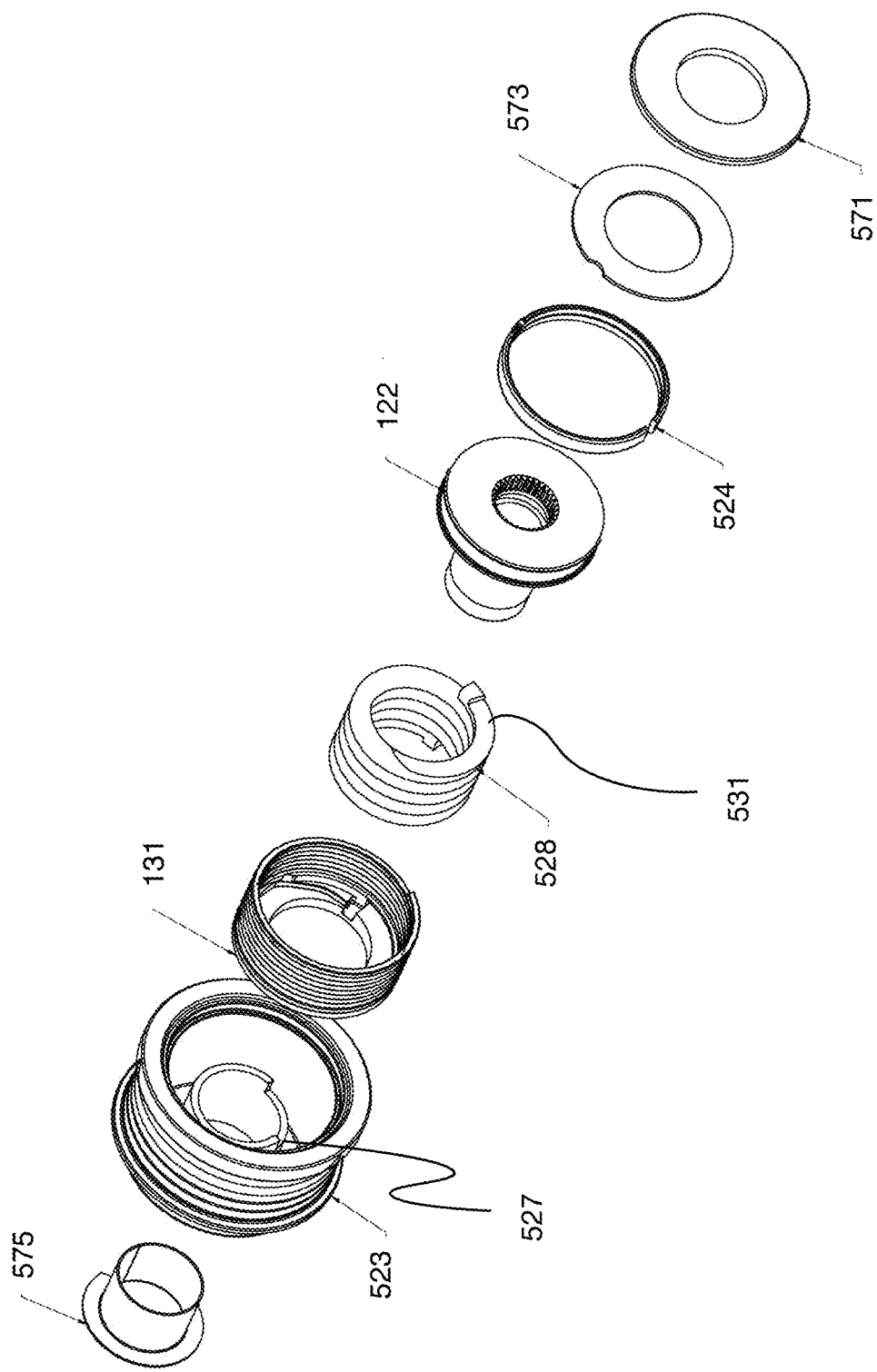
FIG. 26 is an exploded view in a first perspective of the decoupler of FIG. 25.
Figure 27:
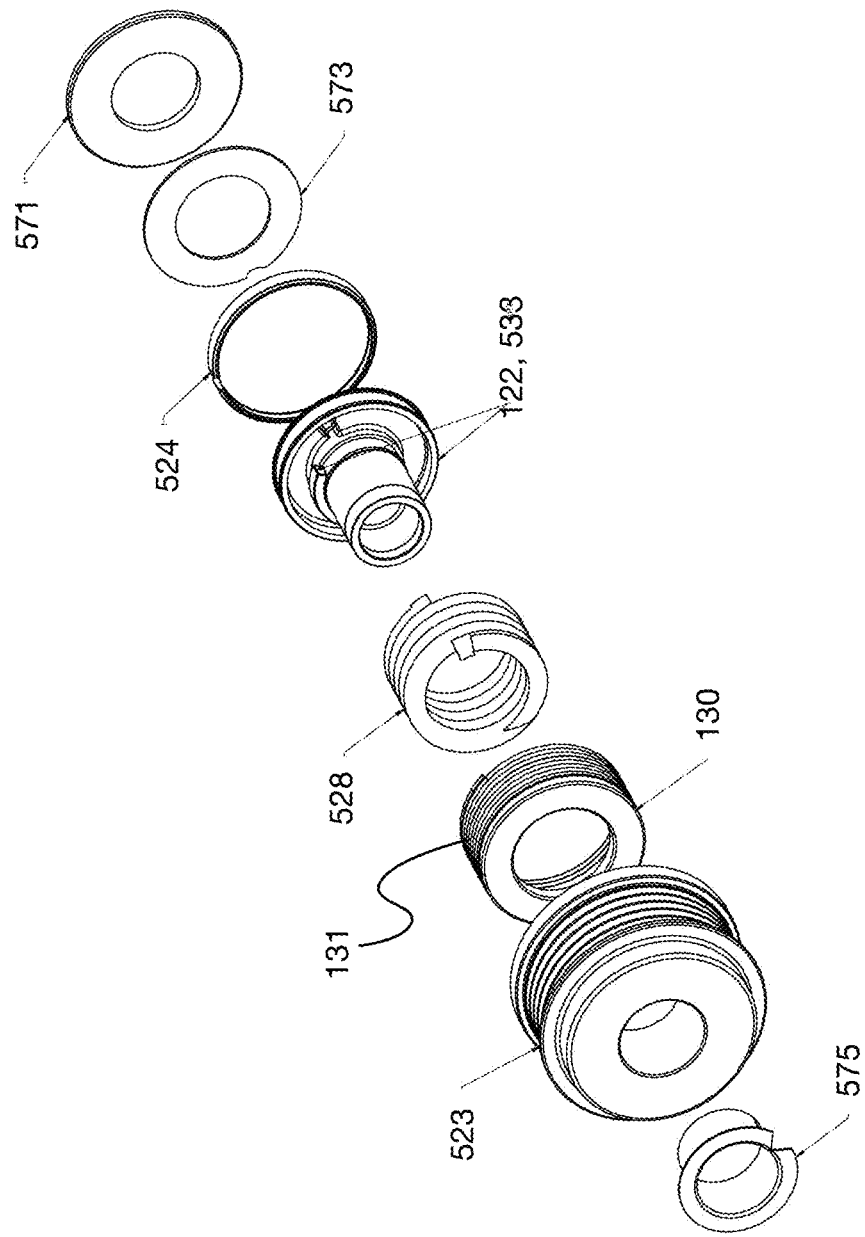
FIG. 27 is an exploded view in a second perspective of the decoupler of FIG. 25.

FIG. 25 depicts a cross-section of an example decoupler 520. The example decoupler 520 includes at least some components that are similar to the components of the example decoupler 120, indicated with like numbers. The decoupler 520 includes a pulley 523 that differs from the pulley 124 in that the pulley 523 includes an inner cylindrical portion 525 having a cutout 527 (FIG. 26). A damping member 533 is positioned between an isolation spring 528 and the hub 122, and interior of at least a portion of the cutout 527. The isolation spring 528 may include a spring cutout 531 (FIG. 26) to accommodate the damping member 533 between the isolation spring 528 and the hub 122. The decoupler 520 includes a bearing member 524 configured to rotatably support the pulley 523 on the hub 122 at a first end 535 of the pulley 523. In some embodiments, the bearing member 524 is a bushing. The decoupler 520 further includes a plug 571, a thrust washer 573 and an inner bushing 575 that is configured to rotatably support the pulley 523 on the hub 122 at a second end 537.

Similarly to the isolation spring 128, the isolation spring 528 is configured to transfer a rotational load between the pulley 523 and the hub 122 and to generate a radial reaction force, Rs, in response. However, in contrast to the isolation spring 128, the isolation spring 528 is configured to contract or wrap inwardly towards the hub 122 in response to transferring the rotational load between the pulley 523 and the hub 122. Since the isolation spring 528 contracts, rather than expands, in response to transferring the rotational load, the radial reaction force, Rs, is instead directed radially inwards towards the hub 122. As the damping member 533 is positioned between the isolation spring 528 and the hub 122 in a position to receive the radial reaction force, Rs, and the damping member 533 is urged by the radial reaction force, Rs, into frictional engagement with a friction surface on the hub 122, such as the outer surface 529 (FIG. 25). The radial reaction force, Rs, varies with the rotational load being transferred by the isolation spring 528. A normal reaction force from the hub 122 is generated in response to the radial reaction force, Rs, at the outer surface 529. Since the damping member 533 is free to slide against the outer surface 529, a frictional force (and a corresponding damping torque) that opposed the rotation of the hub 122 is generated as a portion of the normal reaction force. As in the decoupler 120, when the isolation spring 128 is not transferring rotational load between the pulley 523 and the hub 122, such as during an overrun condition, the damping member 533 is not urged into frictional engagement with the outer surface 529 of the hub 122 and the additional damping torque is not generated.

Figure 28:
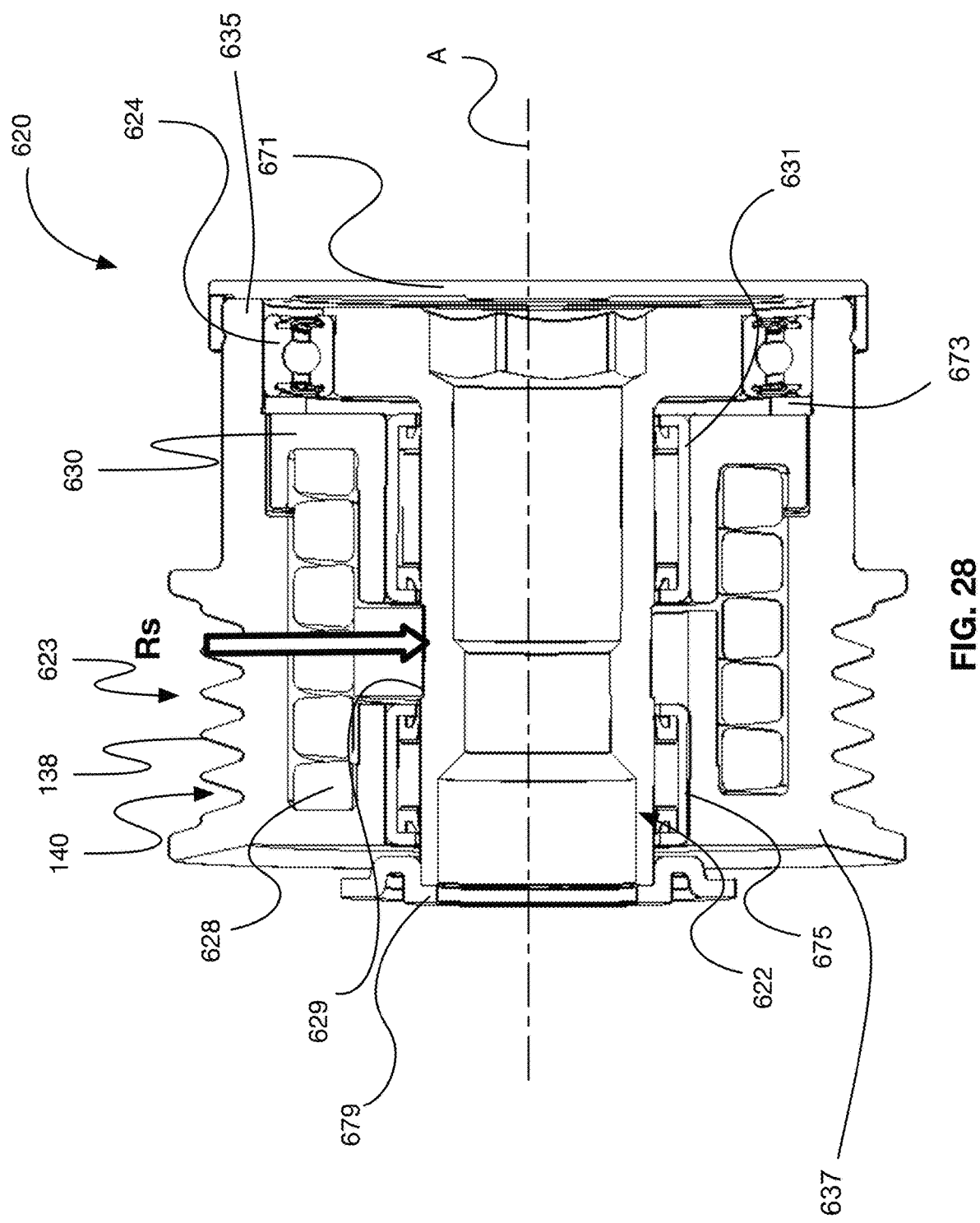
FIG. 28 is a sectional side view of a decoupler according to another set of non-limiting embodiments of the present invention.
Figure 30:
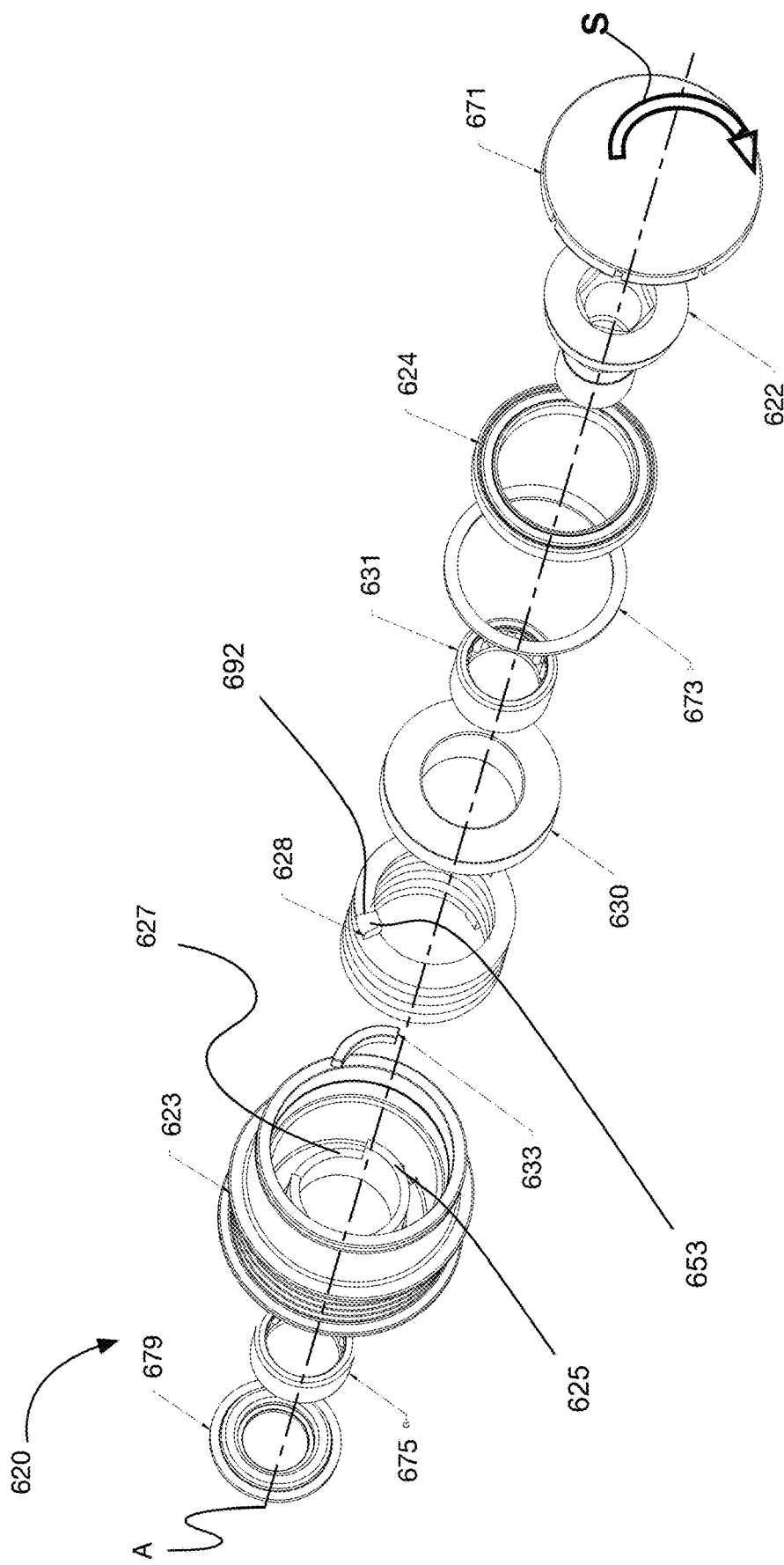
FIGS. 30 and 31 are exploded perspective view of the decoupler shown in FIG. 28.
Figure 33:
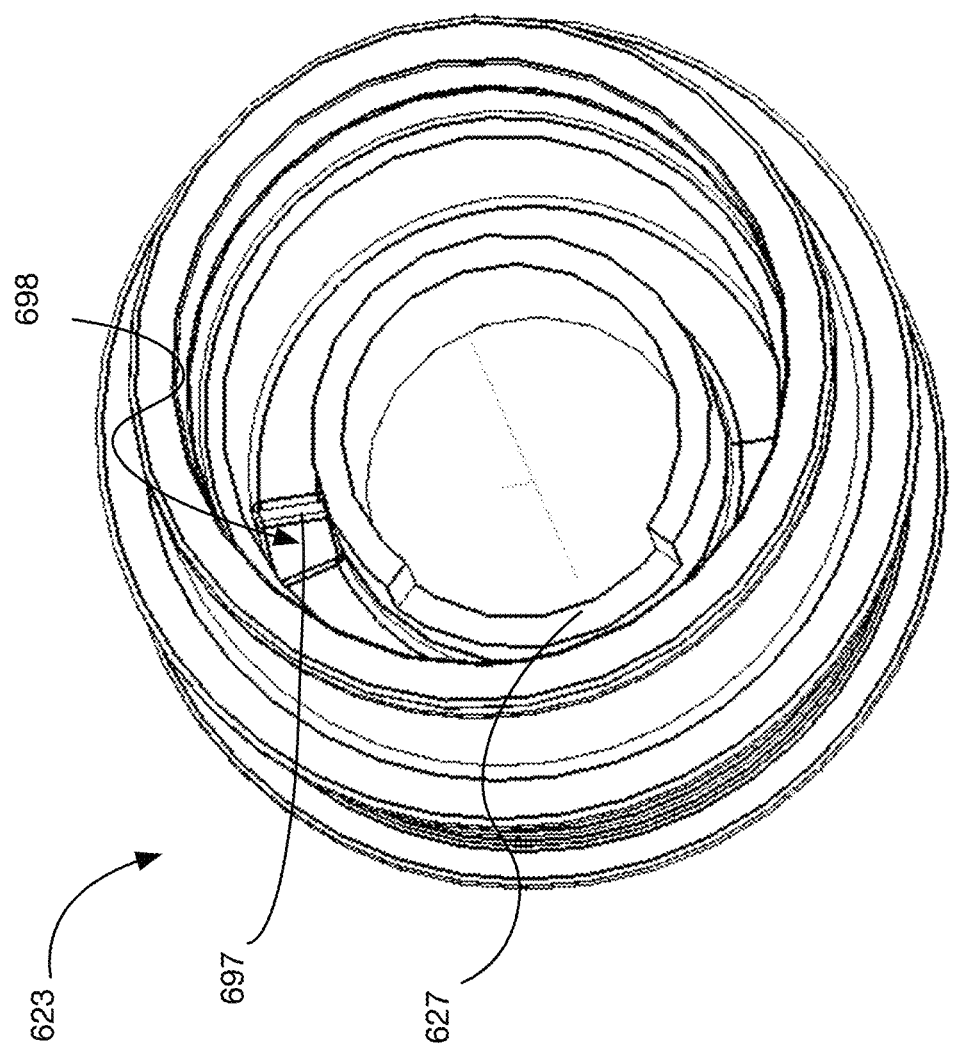
FIG. 33 is a perspective view of a pulley from the decoupler shown in FIG. 28.

FIG. 28 depicts a cross-section of an example decoupler 620. The example decoupler 620 includes at least some components that are similar to the components of the example decoupler 120 and the example decoupler 520, indicated with like numbers. The decoupler 620 includes a pulley 623 that differs from the pulley 124 in that the pulley 623 includes an inner cylindrical portion 625 having a cutout 627 (FIGS. 30, 33). A damping member 633 is positioned between an isolation spring 628 and the hub 622, and interior of at least a portion of the cutout 627. The decoupler 620 includes a first bearing member 624 that is configured to rotatably support the pulley 623 on the hub 622 at a first end 635 of the pulley 623. In some embodiments, the first bearing member 624 is a ball bearing. The decoupler 620 further includes a cover 671, a thrust washer 673 and a second bearing member 675 that is configured to rotatably support the pulley 623 on the hub 622 at a second end 637. As shown in the example decoupler 620, the second bearing member 675 can be a needle or roller bearing.

In contrast to the example decouplers 120 and 520, the example decoupler 620 includes a one-way roller clutch 631. The one-way roller clutch 631 is configured to permit overrunning of one of the pulley 623 and the hub 622 relative to the other of the pulley 623 and the hub 622 in a first rotational direction, such as the direction S (FIG. 30). The one-way roller clutch 631 is located radially inboard of the isolation spring 628.

Figure 31:
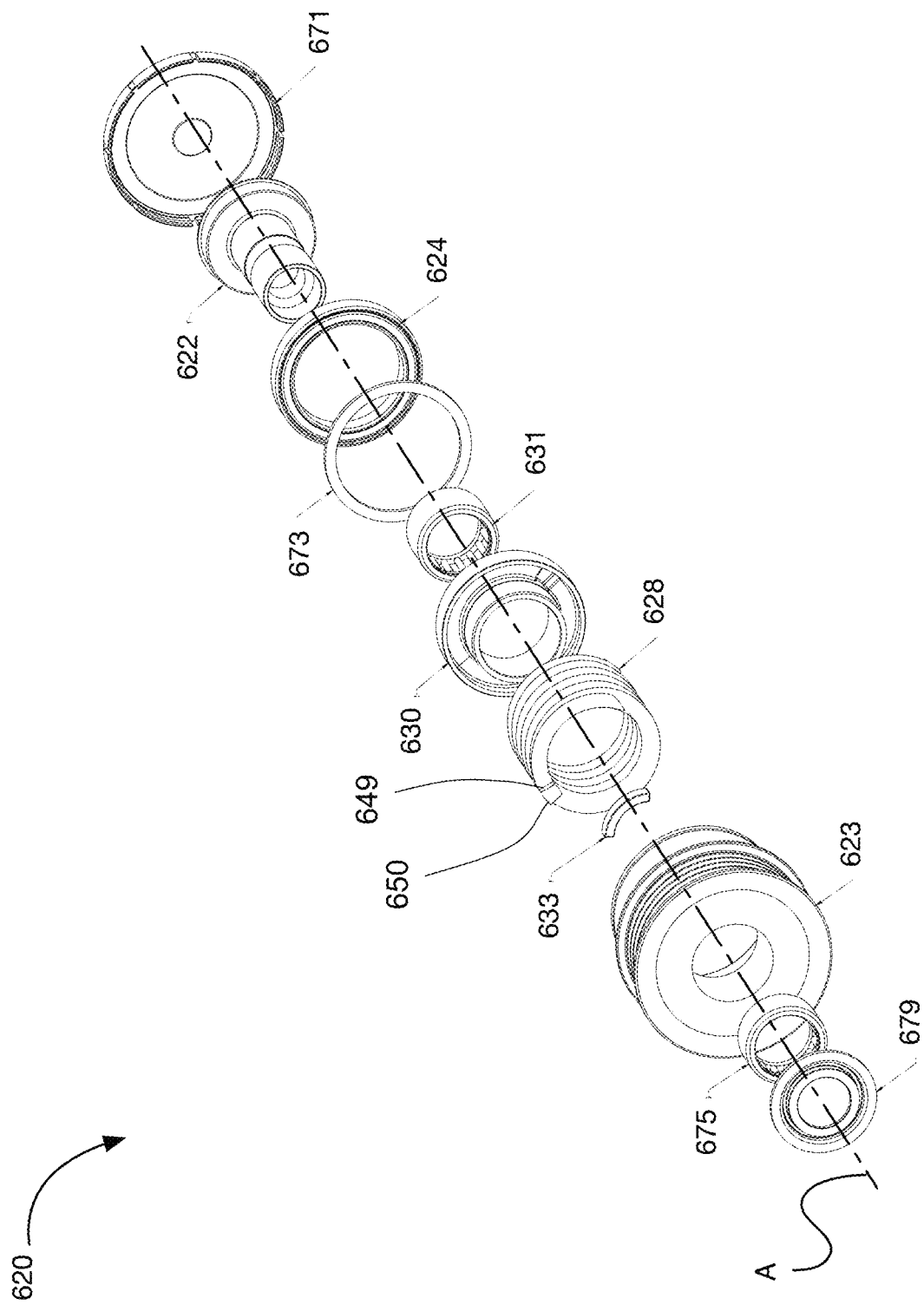
Figure 32B:
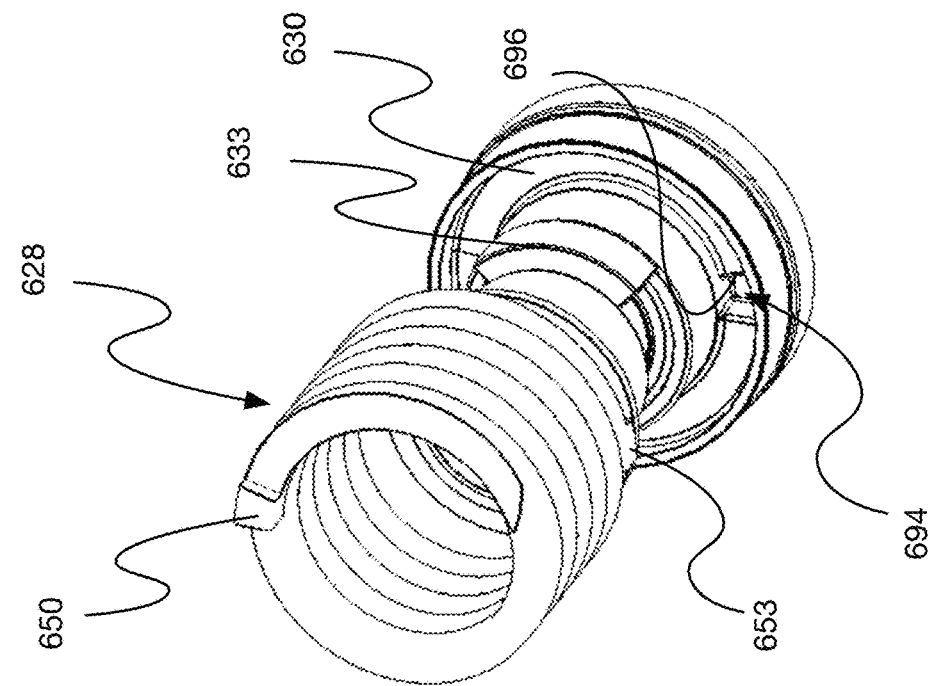
FIGS. 32A and 32B are an exploded side view and an exploded perspective view respectively, of a portion of the decoupler shown in FIG. 28.
Figure 32A:
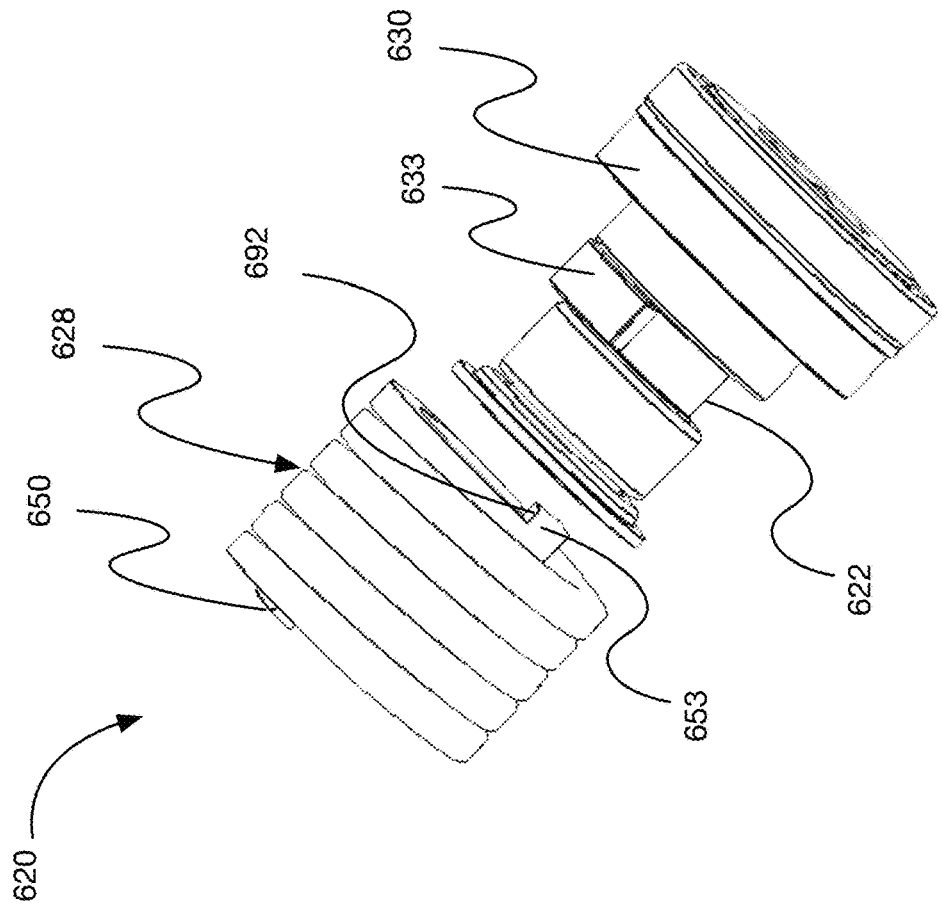

Similarly to the isolation spring 128 and the isolation spring 528, the isolation spring 628 is configured to transfer a rotational load between the pulley 623 and the hub 622 and to generate a radial reaction force, Rs, in response. In particular, similarly to the isolation spring 528, the isolation spring 628 is configured to contract or wrap inwardly towards the hub 622 when transferring a rotational load between the pulley 623 and the hub 622. As shown in FIGS. 32A and 32B, the isolation spring 628 has a first helical end 650 and a second helical end 653. The first helical end 650 includes a pulley engagement face 649 (FIG. 31) and is shaped to fit into a driver slot 698 on the pulley 623 (FIG.

33). The second helical end 653 includes a carrier engagement face 692 (FIG. 32A) and is shaped to fit into a driver slot 694 (FIG. 32B) on the carrier 630. In response to transferring a rotational load between the pulley 623 and the hub 622, the pulley engagement face 649 abuts against an opposing face 697 of the drive slot 698 and the carrier engagement face 692 abuts against an opposing face 696 of the driver slot 694. The first and second helical ends 650, 653 are shaped such that in abutting against the pulley engagement face 649 and the carrier engagement face 692, the isolation spring 628 is compelled to contract or wrap inwardly towards the hub 622.

In wrapping inwardly towards the hub 622, the isolation spring 628 generates the radial reaction force Rs, which urges the damping member 633 into frictional engagement with a friction surface on the hub 622, such as the outer surface 629 (FIG. 28). The radial reaction force, Rs, varies with the rotational load being transferred by the isolation spring 628. A normal reaction force from the hub 622 is generated in response to the radial reaction force, Rs, at the outer surface 629. Since the damping member 633 is at least somewhat constrained to rotate with the hub 622, and therefore slides relative to the outer surface 629 of the hub 622, a frictional force (and, hence an additional damping torque) is transmitted from the pulley 623 to the damping member 633 (and then from the damping member 633 into the hub 622). As in the decoupler 120, when the isolation spring 128 is not transferring rotational load between the pulley 623 and the hub 622, such as during an overrun condition, the damping member 633 is not urged into frictional engagement with the outer surface 629 of the hub 622 and the additional damping torque is not generated.

Figure 29:
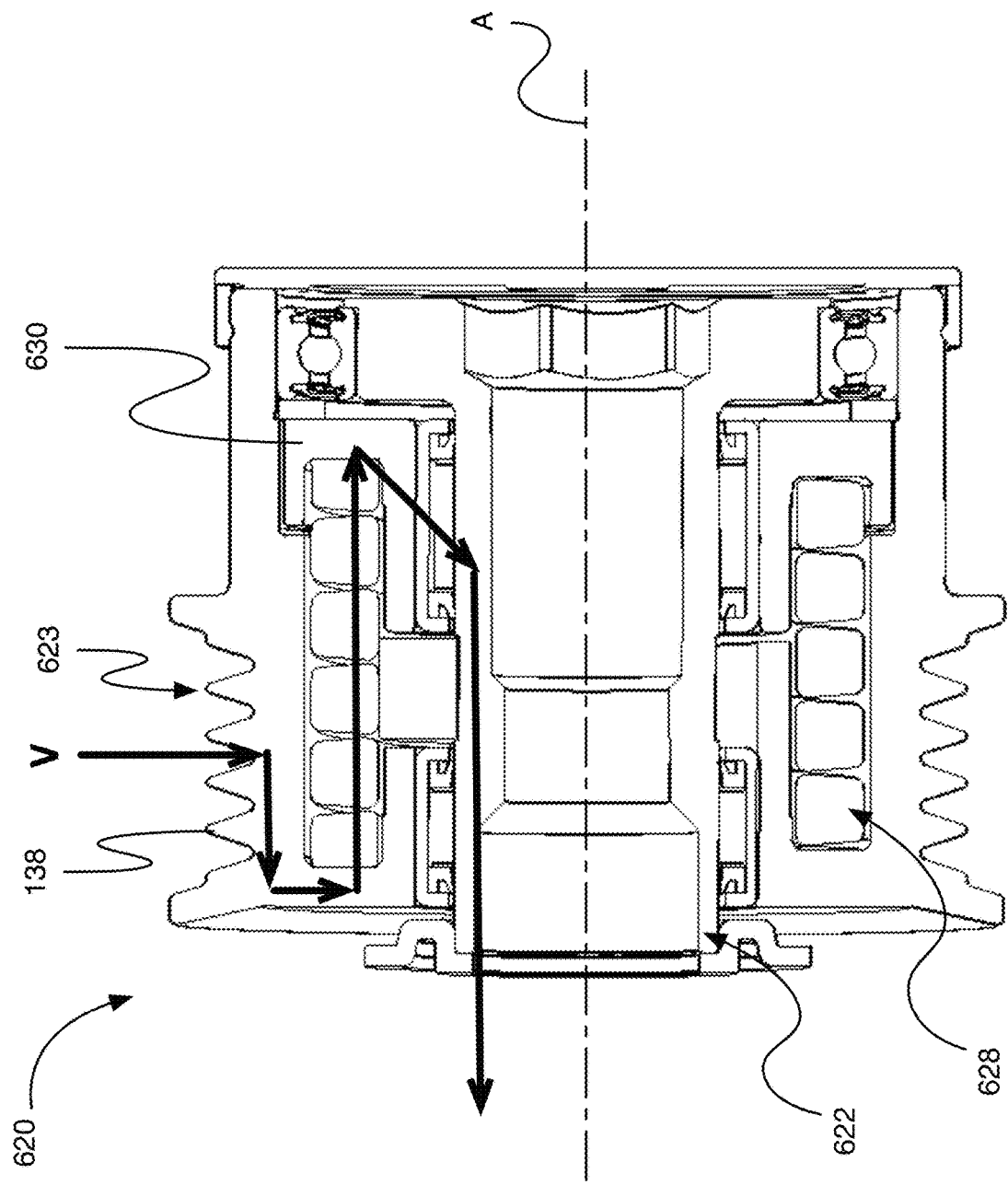
FIG. 29 is the sectional side view of the decoupler shown in FIG. 28, showing a torque path through the decoupler.

FIG. 29 depicts a torque path 699 through the decoupler 620 when a load V is applied to the pulley 623 via the pulley engagement surface 138. The load V is transmitted through the pulley 623 to the first helical end 650 of the isolation spring 628 through to the second helical end 653. The load V is then transferred through the second helical end 653 into the carrier 630, which is mounted about the hub 622 and outboard of the one-way roller clutch 631. The load V is transmitted through the one-way roller clutch 631 to the hub 622 and towards the shaft of the driven element, such as an accessory shaft (not shown).

Figure 35:
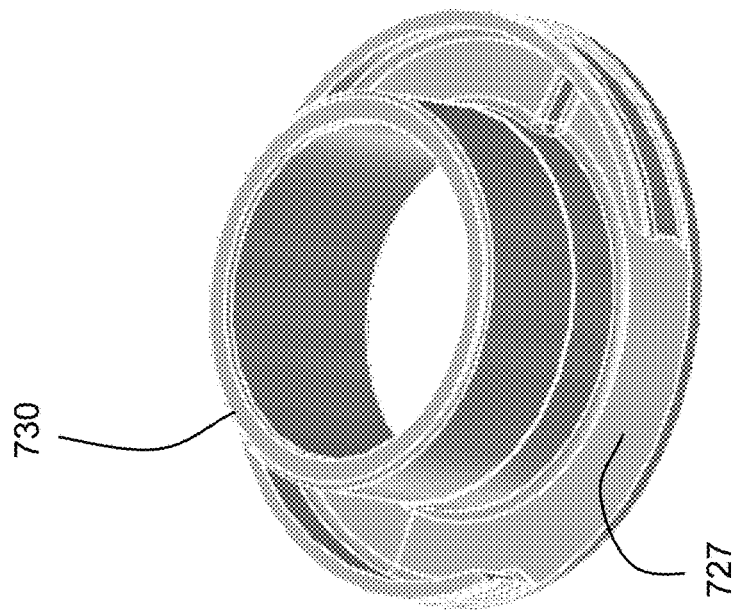
FIG. 35 is a perspective view of a carrier from the decoupler shown in FIG. 34.
Figure 34:
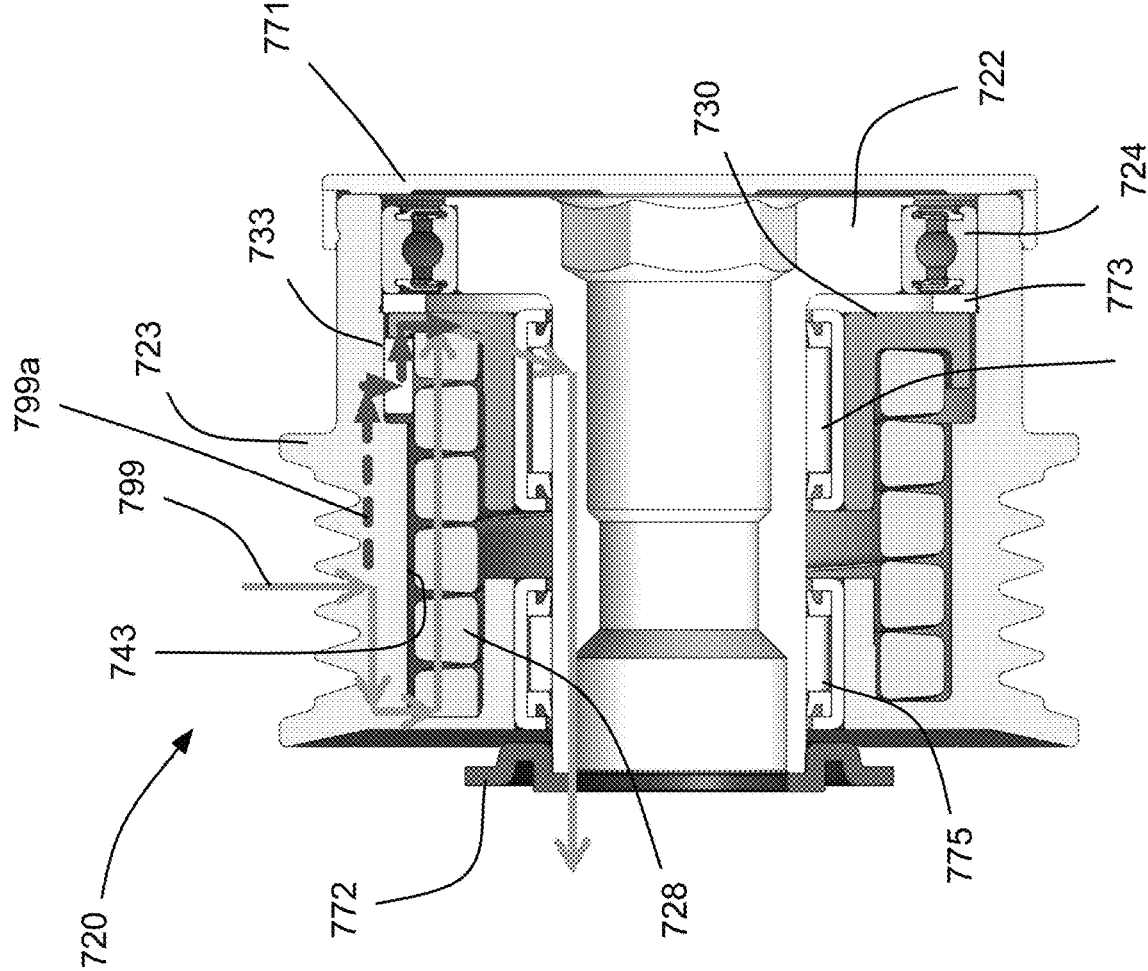
FIG. 34 is a sectional side view of a decoupler according to another set of non-limiting embodiments of the present invention.
Figure 36:
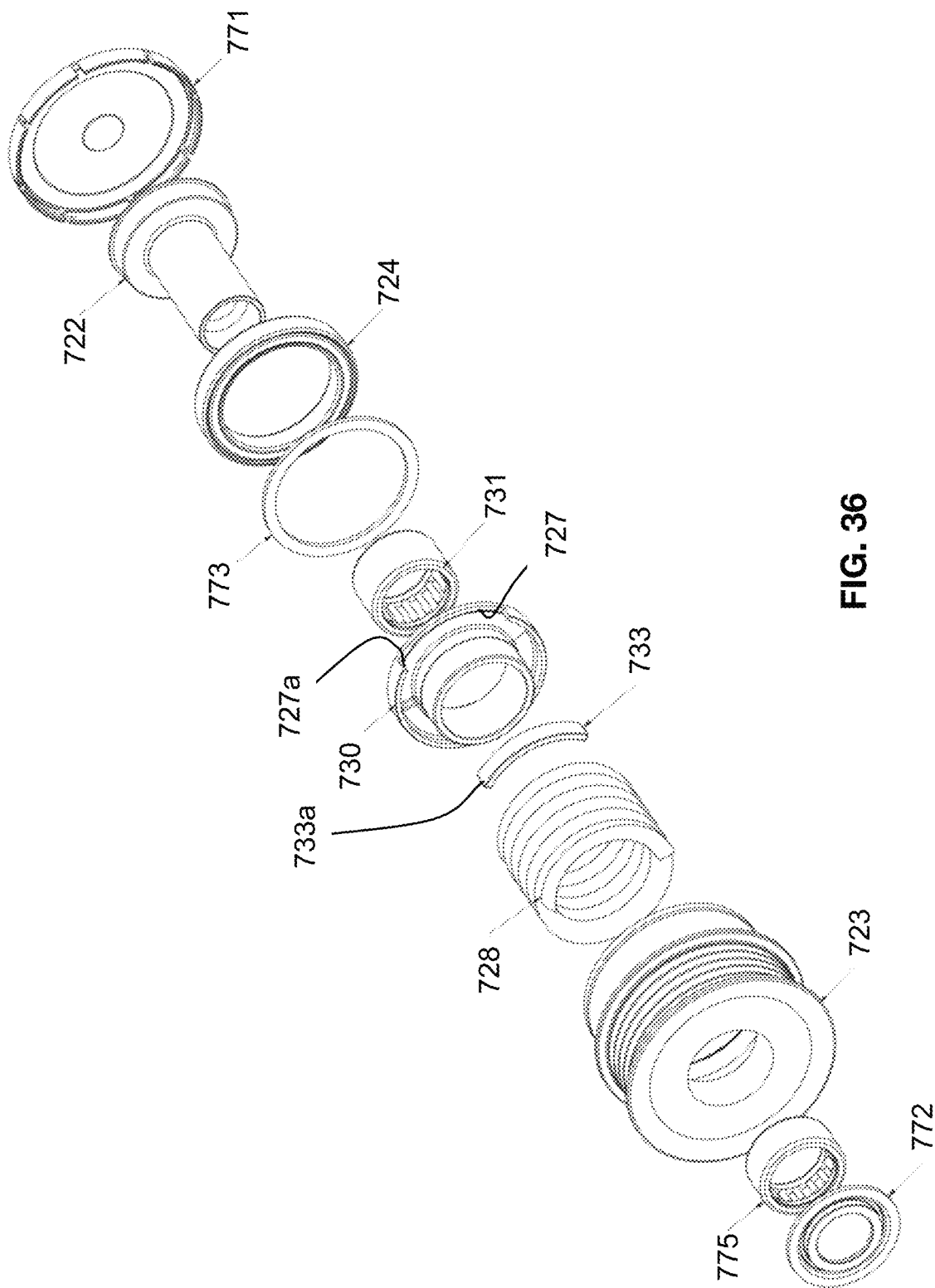
FIG. 36 is an exploded perspective view of the decoupler shown in FIG. 34.

Reference is made to FIGS. 34-36, which show another embodiment of a decoupler 720, which may be similar to the decoupler 620 shown in FIGS. 28-33, but which incorporates an isolation spring 728 that opens during torque transfer instead of the spring 628 which constricts (i.e. closes) during torque transfer in FIGS. 28-33.

A torque path is shown at 799 in FIG. 34, that illustrates torque flow during normal operation of the decoupler 720. Torque is applied to the pulley shown at 723 (which may be similar to the pulley 623), from an endless power transmitting member (not shown) which may be similar to any of the endless power transmitting members described herein. Torque is transferred from the pulley 723 to one end of the isolation spring 728, and from the other end of the isolation spring 728 into the carrier, shown at 730. Torque is further transferred from the carrier 730 into the first one-way roller clutch shown at 731, and from the roller clutch 731 into the hub shown at 722.

The carrier 730 has a cutout 727 (FIG. 35) therein, which holds the damping member shown at 733. The damping member 733 is thus positioned radially outside of the isolation spring 728 and inside of the inner surface shown at 743 of the pulley 723. During torque transfer from the pulley 723 to the hub 722, the isolation spring 728 engages the damping member 733 and drives the damping member 733 into engagement with the inner surface shown at 743 of the pulley 723 in similar manner to the driving of damping member 133 into inner surface 143 of pulley 124 as shown in FIG. 7. As a result, some torque will also be transferred along torque path 799a from the pulley 723 to the damping member 733 via frictional force, and from the damping member 733 into the carrier 730 via engagement between a circumferential end 733a of the damping member 733 and an end (shown at 727a in FIG. 35) of the cutout 727.

With reference to FIG. 36, the decoupler 720 further includes a first bearing member 724 (which may, for example, be a ball bearing) that is configured to rotatably support the pulley 723 on the hub 722 at a first end of the pulley 723. The decoupler 720 further includes a cover 771, a spacer 772, a thrust washer 773 and a second bearing member 775 that is configured to rotatably support the pulley 623 on the hub 722 which may be, for example, a needle bearing or a roller bearing.

Reference is made to FIG. 37, which shows a power transfer device 820 that is similar to the decoupler 720 but which does not include a one-way clutch or a carrier. Thus, the power transfer device 820 may be referred to as an isolator 820. The isolator 820 includes an isolation spring 828 that is similar to the spring 728. A first end of the isolation spring 828 is engaged with a driver wall shown at 901 on the pulley shown at 823. A second end of the isolation spring 828 is engaged with a drive surface on the hub shown at 822. The drive surface on the hub 822 is not specifically shown in FIG. 37, however it will be well understood that it is similar to the drive surface 901 and to the drive surfaces shown on the other hubs in this disclosure. The damping member shown at 833 is positioned in an engagement opening or cutout shown at 870 in the hub 822, in similar manner to the positioning of the damping member 133 in the cutout 170 in FIG. 5.

As can be seen, the isolation spring 828 is directly engaged with the pulley 823 and the hub 823 without a one-way clutch between any of the spring 828 and the pulley 823 or the hub 822. The torque path through the isolator 820 is shown at 899 in FIG. 37. As can be seen, torque is transmitted from the pulley 823 into the first end of the isolation spring 828, through the isolation spring 828, and from the second end of the isolation spring 828 into the hub 822. Additionally, during such torque transfer, another torque path exists due to the presence of the damping member 833, and is shown at 899a. As the isolation spring 828 presses on the damping member 833 in similar manner to the pressing of the isolation spring 128 on the damping member 133 in the embodiment shown in FIGS. 3-9B, a frictional damping force between the damping member 833 and the pulley 823 causes torque to be transferred directly from the pulley 823, through the damping member 833 and into the hub 822 (via one of the circumferential ends of the damping member 833 that will abut one end of the cutout 870 in the hub 822 in which the damping member 833 is positioned. Bearing members are shown at 824 and 837 that are similar to other bearing members described herein. A spacer is shown at 872. A cover is shown at 871.

Persons skilled in the art will appreciate that there are yet more alternative implementations and modifications possible, and that the above examples are only illustrations of one or more implementations. The scope, therefore, is only to be limited by the claims appended hereto.

TABLE OF ELEMENTS:

| Reference # | Item | FIG. # |
|---|---|---|
| 5 | decoupler | 1 |
| 6 | pulley | 1 |
| 7 | power transmitting surface | 1 |
| 8 | hub | 1 |
| 9 | ball bearing | 1 |
| 10 | bushing | 1 |
| 11 | carrier | 1 |
| 12 | torsion spring | 1 |
| 13 | one-way clutch | 1 |
| 14 | inner surface | 1 |
| 15 | inner hub surface | 1 |
| 100 | engine | 2 |
| 102 | crankshaft | 2 |
| 103 | pulley | 2 |
| 104 | endless power transmitting member/belt | 2 |
| 105 | input drive shaft | 2 |
| 106 | accessory | 2 |
| 108 | alternator | 2 |
| 119 | power transfer device | 2 |
| 120 | decoupler | 2 |
| 122 | hub | 3 |
| 124 | pulley | 3 |
| 126 | first bearing member | 3 |
| 128 | isolation spring | 3 |
| 130 | carrier | 3 |
| 131 | one-way clutch | 3 |
| 132 | wrap spring clutch | 3 |
| 133 | damping member | 3 |
| 136 | shaft-mounting aperture | 3 |
| 138 | power transmitting surface | 3 |
| 140 | grooves | 3 |
| 143 | inner surface | 3 |
| 144 | first end of pulley | 3 |
| 150 | first helical end of isolation spring | 3 |
| 151 | first end of wrap spring clutch | 5 |
| 152 | driver wall | 3 |
| 153 | second helical end of isolation spring | 4 |
| 154 | driver wall | 8 |
| 155 | radial wall | 5 |
| 156 | circumferential pad | 7 |
| 157 | sleeve | 3 |
| 158 | first circumferential end | 8 |
| 159 | second end of wrap spring clutch | 4 |
| 160 | second circumferential end | 8 |
| 161 | coils | 4 |
| 162 | metallic supporting structure | 9A |
| 164 | plastic wear element | 9A |
| 166 | second bearing member | 9A |
| 168a | bushing portion | 9A |
| 168b | bushing portion | 9A |
| 170 | engagement opening | 5 |
| 171 | seal cap | 5 |
| 172 | hysteresis loop | 10A |
| 173 | thrust plate | 5 |
| 174 | hysteresis loop | 11A |
| 176a | edge | 5 |
| 176b | edge | 5 |
| 199 | torque path | 3 |
| 199a | torque path | 3 |
| 220 | decoupler | 12 |
| 221 | damping member | 12 |
| 280 | engagement surface | 17 |
| 281 | first end | 17 |
| 283 | second end | 17 |
| 285 | hysteresis loop | 20A |
| 287 | metallic load transfer element | 22 |
| 289 | plastic wear element | 22 |
| 291 | wear surface | 22 |
| 293 | circumferential slot | 14 |
| 295 | second bearing member | 12 |
| 297 | second end | 12 |
| 301 | pulley | 23 |
| 303 | spring | 23 |
| 305 | hub | 23 |
| 307 | drive shaft | 23 |
| 309 | alternator regulator | 23 |
| 311 | endless power transmitting member | 23 |
| 313 | crankshaft | 23 |
| 315 | engine control unit | 23 |
| 317 | engine | 23 |
| 319 | decoupler | 23 |
| 407 | drive shaft | 24 |
| 409 | alternator regulator | 24 |
| 411 | endless power transmitting member | 24 |
| 413 | crankshaft | 24 |
| 415 | engine control unit | 24 |
| 418 | engine | 24 |
| 520 | decoupler | 25 |
| 523 | pulley | 25 |
| 524 | bearing member | 25 |
| 525 | inner cylindrical portion | 25 |
| 527 | cutout | 26 |
| 528 | isolation spring | 25 |
| 529 | outer surface | 25 |
| 531 | spring cutout | 25 |
| 533 | damping member | 25 |
| 535 | first end | 25 |
| 537 | second end | 25 |
| 571 | plug | 25 |
| 573 | thrust washer | 25 |
| 575 | inner bushing | 25 |
| 620 | decoupler | 28 |
| 622 | hub | 28 |
| 623 | pulley | 28 |
| 624 | first bearing member | 28 |
| 625 | inner cylindrical portion | 30 |
| 627 | cutout | 30 |
| 628 | isolation spring | 28 |
| 629 | outer surface | 28 |
| 630 | carrier | 28 |
| 631 | one-way roller clutch | 28 |
| 633 | damping member | 30 |
| 635 | first end | 28 |
| 637 | second end | 28 |
| 649 | pulley engagement face | 31 |
| 650 | first helical end | 31 |
| 653 | second helical end | 32A |
| 671 | cover | 28 |
| 673 | thrust washer | 28 |
| 675 | second bearing member | 28 |
| 692 | carrier engagement face | 32A |
| 694 | driver slot | 32B |
| 697 | torque path | 28 |
| 698 | driver slot | 33 |
| 720 | decoupler | 34 |
| 722 | hub | 34 |
| 723 | pulley | 34 |
| 724 | first bearing member | 34 |
| 727 | cutout | 35 |
| 728 | isolation spring | 34 |
| 730 | carrier | 34 |
| 731 | one-way roller clutch | 34 |
| 733 | damping member | 34 |
| 743 | inner surface | 34 |
| 771 | cover | 34 |
| 772 | spacer | 34 |
| 773 | thrust washer | 34 |
| 775 | second bearing member | 34 |
| 799 | torque path | 34 |
| 799a | torque path | 34 |
| 820 | power transfer device/isolator | 37 |
| 822 | hub | 37 |
| 823 | pulley | 37 |
| 824 | bearing member | 37 |
| 828 | isolation spring | 37 |
| 833 | damping member | 37 |
| 837 | bearing member | 37 |
| 870 | engagement opening/cutout | 37 |
| 871 | cover | 37 |
| 872 | spacer | 37 |

-continued

TABLE OF ELEMENTS:

| Reference # | Item | FIG. # |
|---|---|---|
| 899 | torque path | 37 |
| 901 | drive surface | 37 |

What is claimed is:

1. A decoupler for transferring torque between a shaft and an endless power transmitting member, the decoupler comprising:
    a hub configured to couple to the shaft and to rotate with the shaft about a rotational axis;
    a pulley rotatably coupled to the hub and including a power transmitting surface configured to engage the endless power transmitting member;
    an isolation spring configured to transfer a rotational load from one of the pulley and the hub to the other of the pulley and the hub;
    a one-way clutch configured to permit overrunning of one of the pulley and the hub relative to the other of the pulley and the hub in a first rotational direction;
    a damping member positioned to be driven into frictional engagement with a friction surface on one of the pulley and the hub by a force acting on the damping member that varies based on the rotational load transferred by the isolation spring, such that a frictional damping force that is provided by the damping member varies based on the rotational load transferred by the isolation spring,
    wherein the damping member is radially between the isolation spring and the friction surface, and the force is a radial reaction force generated by the isolation spring in response to the rotational load being transferred, which urges the damping member into the friction surface; and
    a bearing member that is a bushing, and which is configured to support the pulley on the hub and the bearing member includes the damping member, wherein the friction surface is a radially inner surface of the pulley.

2. The decoupler of claim 1, wherein the damping member is circumferentially aligned with the radial reaction force to drive the damping member into frictional engagement with the friction surface.

3. The decoupler of claim 1, wherein:
    the radial reaction force is directed to a radial position that is about 90 degrees from a helical end of the isolation spring coupled to the hub and the damping member includes a circumferential pad that is radially offset from the end of the isolation spring and is configured to receive the radial reaction force.

4. The decoupler of claim 3, wherein:
    the circumferential pad has a first circumferential end that is radially offset from the helical end of the isolation spring by about 45 degrees.

5. The decoupler of claim 1, wherein the damping member is seated within an engagement opening in the hub.

6. The decoupler of claim 4, wherein the circumferential pad includes a second circumferential end that is about 90 degrees from the first circumferential end.

7. The decoupler of claim 1, wherein the damping member has a wear thickness based on a selected number of duty cycles of an engine crankshaft that is operatively coupled to the endless power transmitting member.

8. The decoupler of claim 1, wherein the isolation spring is a helical torsion spring having a first helical end and a second helical end.

9. The decoupler of claim 8, wherein:
    the rotational load transferred by the isolation spring is transferred to the hub via the second helical end,
    the damping member is circumferentially between the second helical end and the hub so as to transfer the rotational load between the second helical end and the hub, and is movable in a radial direction,
    the damping member includes a first end configured to engage the second helical end and a second end that is circumferentially offset from the first end by an angular width, wherein the second end is configured to engage an engagement surface of the hub, and
    the force from the isolation spring is a vector portion of a magnitude of the rotational load transferred between the isolation spring and the hub via the damping element and is based on the angular width.

10. The decoupler of claim 9, wherein the angular width is between about 90 and about 180 degrees.

11. The decoupler of claim 9, wherein the damping member includes a metallic load transfer element and a plastic wear element.

12. The decoupler of claim 11, wherein the plastic wear element has a wear thickness based on a selected number of duty cycles of an engine crankshaft operatively coupled to the endless power transmitting member.

13. The decoupler of claim 9, wherein the engagement surface is a surface of a circumferential slot in the hub.

14. The decoupler of claim 9, further comprising a bearing member configured to support the pulley on the hub.

15. The decoupler of claim 14, wherein the bearing member is a bushing.

16. The decoupler of claim 1, wherein the force from the isolation spring acting on the damping member varies in proportion to the rotational load transferred by the isolation spring.

17. The decoupler of claim 1, wherein the damping member includes a metallic supporting structure and a plastic wear element.

18. The decoupler of claim 1, wherein the force acting on the damping member is from the isolation spring.

19. A power transfer device for transferring torque between a shaft and an endless power transmitting member, the power transfer device comprising:
    a hub configured to couple to the shaft and to rotate with the shaft about a rotational axis;
    a pulley rotatably coupled to the hub and including a power transmitting surface configured to engage the endless power transmitting member;
    an isolation spring configured to transfer a rotational load from one of the pulley and the hub to the other of the pulley and the hub; and
    a damping member positioned to be driven into frictional engagement with a friction surface on one of the pulley and the hub by a force acting on the damping member that varies based on the rotational load transferred by the isolation spring.

20. The power transfer device of claim 19, further comprising a one-way clutch configured to permit overrunning of one of the pulley and the hub relative to the other of the pulley and the hub in a first rotational direction.

21. The power transfer device of claim 19, wherein the isolation spring is directly engaged with the pulley and the hub, without a one-way clutch.

* * * * *